US 11,772,001 B2

(12) United States Patent
Watanabe

(10) Patent No.: US 11,772,001 B2
(45) Date of Patent: *Oct. 3, 2023

(54) GAME PROCESSING PROGRAM, GAME PROCESSING METHOD, AND GAME PROCESSING DEVICE

(71) Applicant: GREE, INC., Minato-ku (JP)

(72) Inventor: Masashi Watanabe, Tokyo (JP)

(73) Assignee: GREE, INC., Minato-ku (JP)

( * ) Notice: Subject to any disclaimer, the term of this patent is extended or adjusted under 35 U.S.C. 154(b) by 67 days.

This patent is subject to a terminal disclaimer.

(21) Appl. No.: 17/224,096

(22) Filed: Apr. 6, 2021

(65) Prior Publication Data

US 2021/0220745 A1 Jul. 22, 2021

Related U.S. Application Data

(63) Continuation of application No. 15/948,249, filed on Apr. 9, 2018, now Pat. No. 10,994,211.

(30) Foreign Application Priority Data

May 11, 2017 (JP) ................................. 2017-095053

(51) Int. Cl.
*A63F 13/818* (2014.01)
*G06F 3/01* (2006.01)
(Continued)

(52) U.S. Cl.
CPC ........ *A63F 13/818* (2014.09); *A63F 13/2145* (2014.09); *A63F 13/426* (2014.09); *G06F 3/011* (2013.01); *G06F 3/012* (2013.01); *A63F 2300/10* (2013.01); *A63F 2300/308* (2013.01); *A63F 2300/8035* (2013.01)

(58) Field of Classification Search
CPC .... A63F 13/818; A63F 13/211; A63F 13/214; A63F 13/25; A63F 13/42; A63F 13/44; A63F 13/5255
See application file for complete search history.

(56) References Cited

U.S. PATENT DOCUMENTS

2007/0060383 A1   3/2007 Dohta
2007/0265085 A1   11/2007 Miyamoto
(Continued)

FOREIGN PATENT DOCUMENTS

JP   H 11-226261 A    8/1998
JP   2000-167245 A    6/2000
(Continued)

OTHER PUBLICATIONS

Office Action dated Sep. 20, 2021 in co-pending U.S. Appl. No. 15/948,295.
(Continued)

*Primary Examiner* — Yingchuan Zhang
(74) *Attorney, Agent, or Firm* — Oblon, McClelland, Maier & Neustadt, L.L.P.

(57) ABSTRACT

A game processing device changes a movement direction of a moving object from a first direction, which is a movement direction of the moving object, to a second direction based on an operation direction of the controller if an operation of the controller in a direction that is different from the first direction is detected.

19 Claims, 15 Drawing Sheets

(51) Int. Cl.
*A63F 13/426* (2014.01)
*A63F 13/2145* (2014.01)

(56) References Cited

U.S. PATENT DOCUMENTS

| | | | |
|---|---|---|---|
| 2009/0170579 A1* | 7/2009 | Ishii | A63F 13/44 463/2 |
| 2011/0223999 A1 | 9/2011 | Tsujino | |
| 2012/0226369 A1 | 9/2012 | Mori | |
| 2014/0066200 A1 | 3/2014 | Matsui | |
| 2016/0030850 A1 | 2/2016 | Sophos | |

FOREIGN PATENT DOCUMENTS

| | | |
|---|---|---|
| JP | 2010-119788 A | 6/2010 |
| JP | 5437295 | 3/2014 |
| JP | 2015-221117 A | 12/2015 |
| WO | WO 2006/070741 | 7/2006 |

OTHER PUBLICATIONS

Fishing Planet Game Review.pdf, Retrieved from the internet: https://web.archive.org/web/20150926222952/https://mmos.com/review/fishing-planet , 2015, 2 pages.

Final Office Action dated Jan. 26, 2022 in co-pending U.S. Appl. No. 15/948,295.

Non-Final U.S. Office Action dated Aug. 19, 2019 in U.S. Appl. No. 15/948,295.

Non-Final U.S. Office Action dated Jul. 18, 2019 in U.S. Appl. No. 15/948,272.

Non-Final U.S. Office Action dated Jul. 30, 2019 in U.S. Appl. No. 15/948,076.

Final Office Action dated Dec. 27, 2019 in U.S. Appl. No. 15/948,076.

Final Office Action dated Dec. 27, 2019 in U.S. Appl. No. 15/948,272.

Final Office Action dated Jan. 7, 2020 in U.S. Appl. No. 15/948,295.

Office Action dated Jul. 15, 2020 in corresponding U.S. Appl. No. 15/948,076.

20 tips and secrets Pokémon Go won't tell you GameCrate Jul. 11, 2016.pdf, https://gamecrate.com/20-tips-and-secrets-pok%C3%A9mon-go-wont-tell-you/14078 last accessed Jul. 10, 2020 (Year: 2016).

Pokemon Go—What does the size of the multicoloured circle mean Arqade Jul. 8, 2016.pdf, https://gaming.stack-exchange.com/questions/272918/what-does-the-size-of-the-mulicolouredcircle-mean (Year: 2016).

Office Action dated Aug. 18, 2020 in corresponding U.S. Appl. No. 15/948,272.

Office Action dated Sep. 29, 2020 in corresponding U.S. Appl. No. 15/948,295.

Final Office Action dated Nov. 30, 2020 in U.S. Appl. No. 15/948,272.

Notice of Allowance dated Dec. 24, 2020 issued in U.S. Appl. No. 15/948,076.

Final Office Action dated Feb. 10, 2021 in corresponding U.S. Appl. No. 15/948,295.

Fishing_Derby_-_1980_-_Activision.pdf, https://www.gamesdatabase.org/Media/SYSTEM/Atari_2600//Menual/formated/Fishing_Derby_-_1980_-_Activision.pdf, 1980 (Year: 1980), 3 pages.

Office Action dated Mar. 9, 2021 in corresponding Japanese Patent Application No. 2017-095051 with English Translation.

"Playing manual of Final Fantasy XI, Rise of the Zilart,"; Final Fantasy XI, Square Enix; Mar. 31, 2005; p. 44 with concise explanation of relevance.

Biq Bass Fishing https://www.gamesdatabase.org/Media/SYSTEM/Sony_Playstation/Manual/formated/Big_Bass_Fishing_-_2002_-_Take _2_Interactive.pdf, published 2002, last accessed Aug. 11, 2020 (Year: 2002).

Japanese Office Action dated Mar. 29, 2022 in Japanese Patent Application No. 2017-95051 (with unedited computer generated English translation), 2 pages.

Japanese Office Action dated Mar. 29, 2022 in Japanese Patent Application No. 2017-95051 (with unedited computer generated English translation), 5 pages.

"Umitsuri ni ikou!" Weekly Famitsu, ASCII Corporation, Apr. 23, 1999, vol. 14, No. 17, p. 49 (with concise English language explanation of relevance).

Office Action dated Oct. 31, 2022 in co-pending U.S. Appl. No. 17/222,882.

Final Office Action dated Feb. 28, 2023 in co-pending U.S. Appl. No. 17/222,882.

DragoniteRunAway.pdf, screenshot from youTube video https://www.youtube.com/watch?v=iLKSo2a15Sk (Year: 2016).

Office Action dated Jun. 5, 2023 in Japanese Application No. 2022-098543, with English translation.

\* cited by examiner

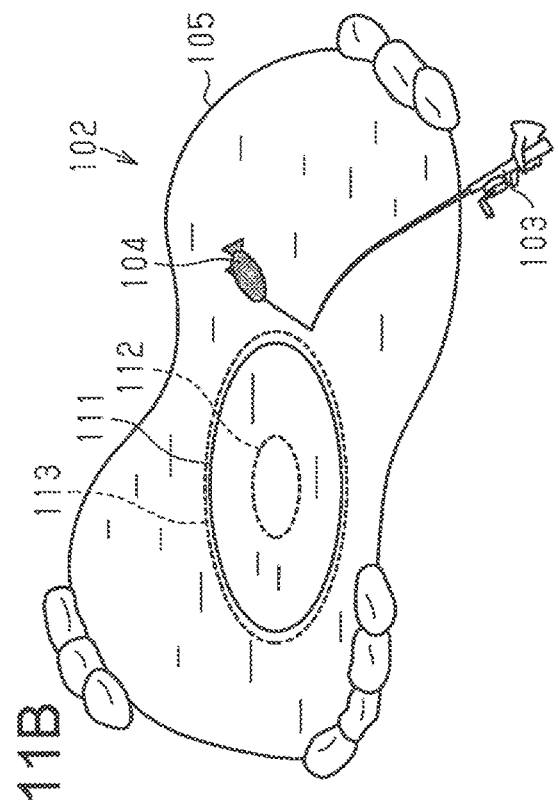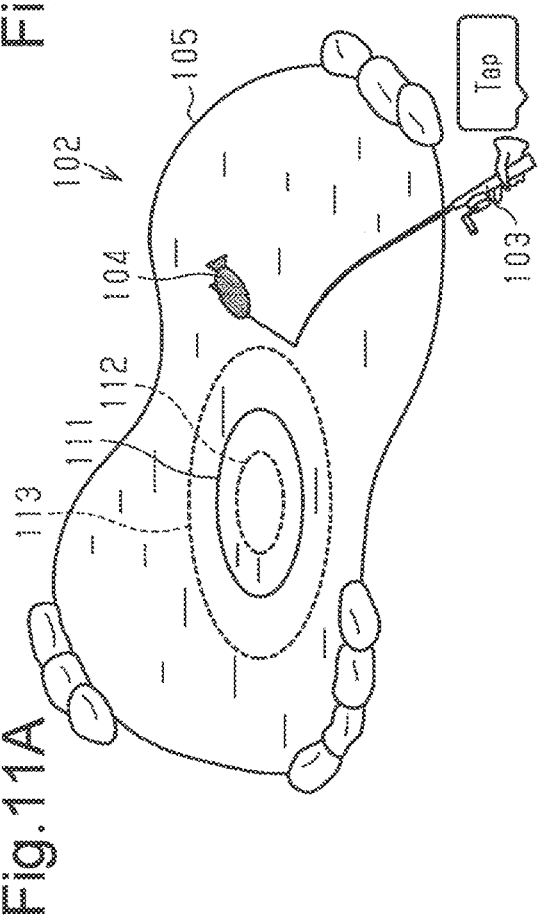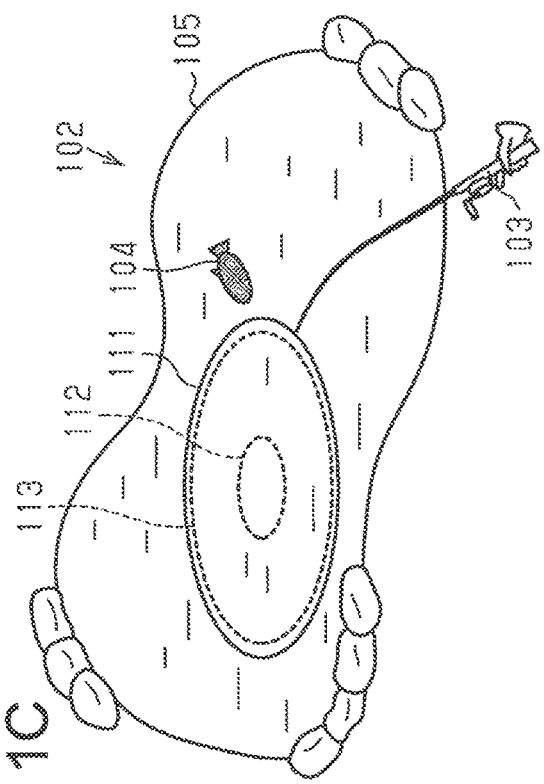

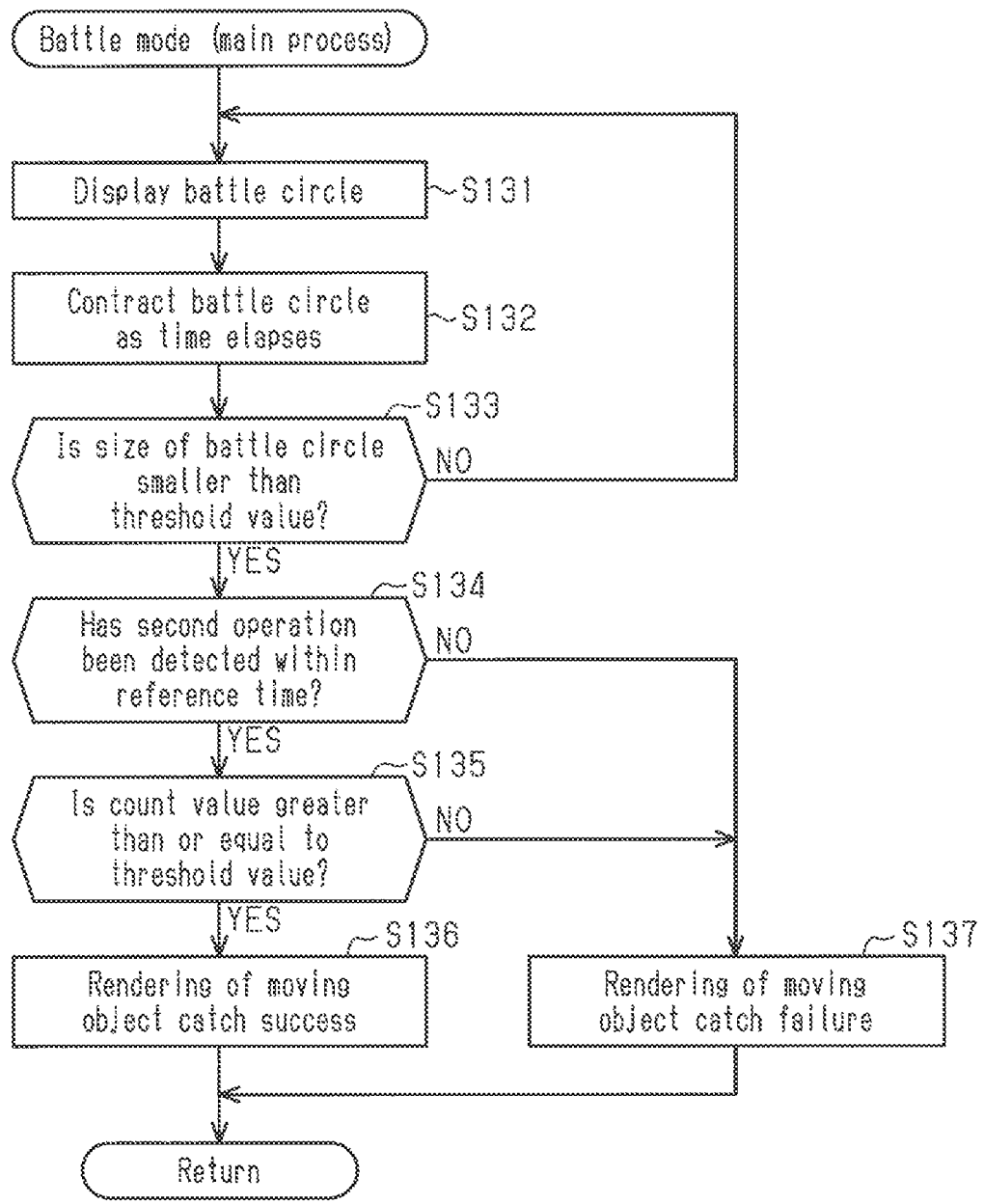

GAME PROCESSING PROGRAM, GAME PROCESSING METHOD, AND GAME PROCESSING DEVICE

CROSS-REFERENCE TO RELATED APPLICATION

This application is a continuation of U.S. application Ser. No. 15/948,249, filed Apr. 9, 2018, which claims priority to Japanese Application No. JP 2017-095053, filed May 11, 2017, the entire contents of each of which are hereby incorporated by reference.

BACKGROUND

The present disclosure relates to a game processing program, a game processing method, and a game processing device in which operation performed on a moving object in a game field is controlled.

A known game simulates the experience of operating a virtual moving object. Japanese Patent No. 5437295 discloses a fishing game in which a player touches a touch panel by a finger and moves the finger in accordance with the movement of a fish to decrease a value of the health of the fish. Further, the player repeatedly moves the finger touching the touch panel in a vertical direction to decrease a value of the distance to the fish. The fish is caught when the health value and the distance value both become less than or equal to their reference values.

However, in the fishing game of Japanese Patent No. 5437295, the player has to follow a predetermined movement of the fish by moving the finger in contact with the touch panel in order to decrease the health value of the fish. Since the movement of the fish is predetermined, the player only moves the contact position on the touch panel in accordance with the movement of the fish. That is, the player can only perform simple operations.

SUMMARY

It is an object of the present disclosure to adjust the position of a moving object by operating a controller in a game that controls operation performed on the moving object in a game field.

To achieve the above object, in one aspect of the present disclosure, a non-transitory computer-readable medium that stores a program is provided. The program, when executed by a processor, causes the processor to change a movement direction of a moving object from a first direction, which is a movement direction of the moving object, to a second direction based on an operation direction of the controller if an operation of the controller in a direction that is different from the first direction is detected.

In another aspect, a method for presenting a game is provided. The method includes, by circuitry, changing a movement direction of a moving object from a first direction, which is a movement direction of the moving object, to a second direction based on an operation direction of the controller if an operation of the controller in a direction that is different from the first direction is detected.

In a further aspect, a game processing device including circuitry is provided. The circuitry is configured to perform change a movement direction of a moving object from a first direction, which is a movement direction of the moving object, to a second direction based on an operation direction of the controller if operation of the controller in a direction that is different from the first direction is detected.

BRIEF DESCRIPTION OF THE DRAWINGS

The features of the present disclosure that are believed to be novel are particularly described in the accompanying claims. The present disclosure, together with objects and advantages thereof, may be understood by reference to the following description of the presently preferred embodiments together with the accompanying drawings in which:

FIGS. 11A to 11C are schematic diagrams each illustrating an image displayed on the display during the execution of the battle mode of the first embodiment;

FIG. 15 is a flowchart illustrating a main process for a battle mode of a second embodiment;

DETAILED DESCRIPTION OF THE PREFERRED EMBODIMENTS

First Embodiment

A first embodiment of a game processing program, a game processing method, and a game processing device will now be described. In the present embodiment, the game processing device executes the game processing program in a state in which each player wears a head-mounted display (HMD)

on the head, thereby presenting the player with a game in which a controller is used for input operations. In the present embodiment, a case in which two players simultaneously play the game will be described.

[Overview of System]

Figure 1:
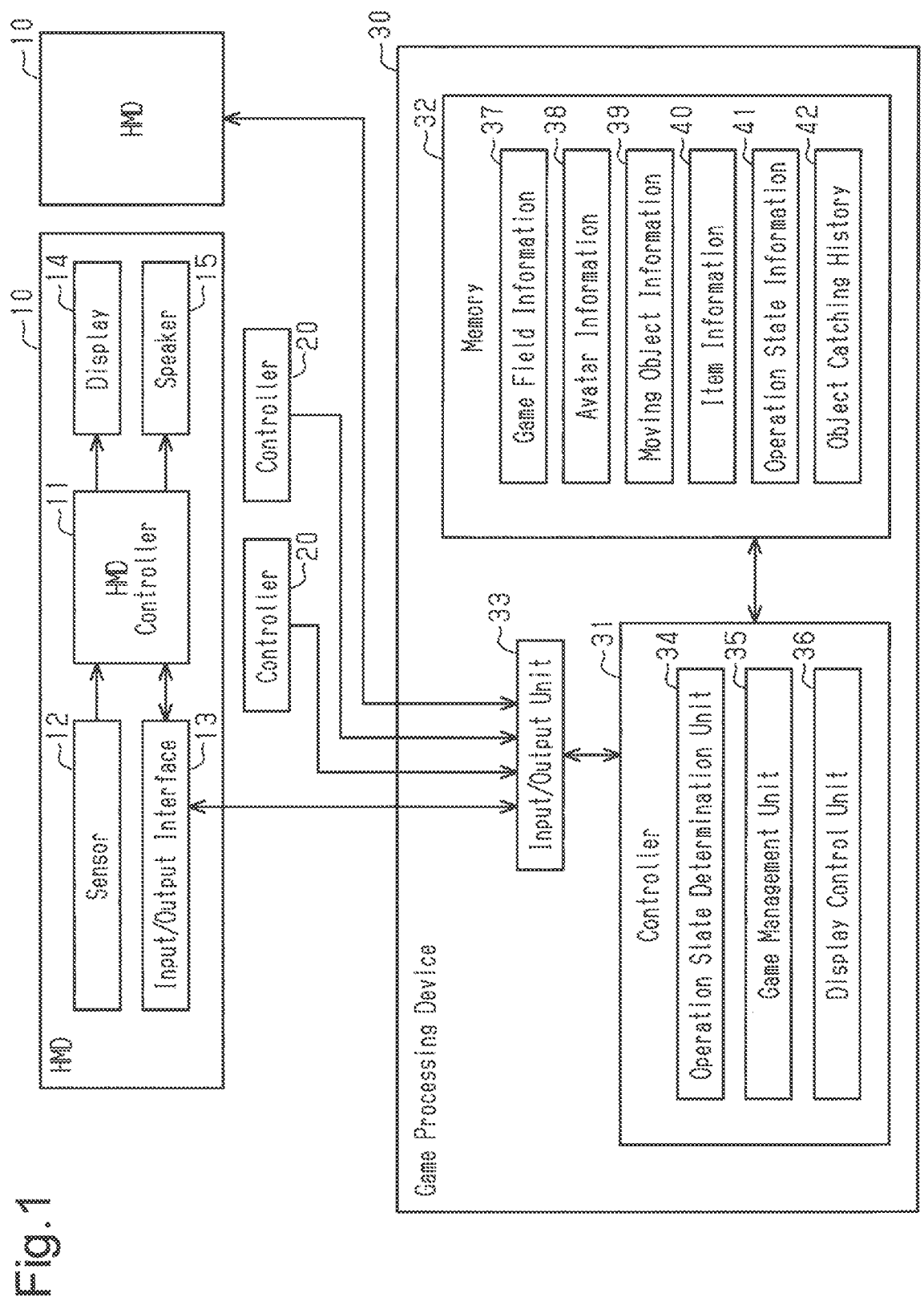
FIG. 1 is a schematic diagram illustrating a first embodiment of a system.

The systems of an HMD 10, controllers 20, and a game processing device 30 will now be described with reference to FIG. 1. First, the HMD 10 that is connected to the game processing device 30 will be described. The HMD 10 includes an HMD controller 11, a sensor 12, and an input/output interface (I/F) 13. The HMD controller 11 outputs various information to the game processing device 30 via the input/output I/F 13 and receives various information that is input from the game processing device 30. The sensor 12 is a sensor that detects motion of the head of a player including the position and orientation of the head of the player. The sensor 12 includes, for example, at least one of a gyro sensor, an acceleration sensor, and a geomagnetic sensor.

Further, the HMD 10 includes a display 14 for displaying an image and a speaker 15 for outputting audio. For example, the display 14 displays an image for the left eye and an image for the right eye with a parallax. This allows the player to look at a three-dimensional image with depth perception. The HMD controller 11 displays, on the display 14, an image corresponding to an image signal received from the game processing device 30 via the input/output I/F 13. The speaker 15 is, for example, a headphone and outputs a sound effect, audio or the like that explains the progress of the game. The sensor 12 and the speaker 15 may be arranged separately from the HMD 10.

Each controller 20 detects motion of the controller 20 including the position and orientation of the controller 20. The controller 20 includes, for example, at least one of a gyro sensor, an acceleration sensor, and a geomagnetic sensor. Further, the controller 20 includes a determination button. The controller 20 outputs, to the game processing device 30, various information including the detection result of the motion of the controller 20 and whether or not the determination button has been operated (for example, tapping operation). The controller 20 may be a controller including an operation portion other than the determination button or may be a controller that accepts an input operation performed on the touch panel display.

[Game Processing Device 30]

The game processing device 30 will now be described. The game processing device 30 includes a control unit 31, a memory unit 32, and an input/output unit 33. The control unit 31 includes hardware elements such as a CPU, a RAM, and a ROM. Further, the control unit 31 includes an operation state determination unit 34, a game management unit 35, and a display control unit 36. In the present embodiment, the control unit 31 functions as the operation state determination unit 34, the game management unit 35, and the display control unit 36 by causing the hardware elements to execute the game processing program.

The memory unit 32 stores game field information 37, avatar information 38, moving object information 39, item information 40, operation state information 41, and an object catching history 42.

The game field information 37 is data used to draw the background of a game field shared by two players. The game field information 37 includes information related to the initial position for an avatar arranged in the game field by each player as a game element, information related to the type of moving object arranged in the game field, and the like.

The avatar information 38 is data used to draw the avatars arranged in the game field and respectively associated with the players when the game is executed.

The moving object information 39 is information related to a moving object displayed in the game field. The moving object information 39 includes movement range information used to set a movement range of the moving object in the game field, an attribute of an moving object (for example, parameter of moving object related to difficulty level indicating catching difficulty), and the like. The catching of a moving object means the provision of the moving object to a player and is achieved by recording identification information of the player in association with identification information of the moving object.

The item information 40 is information related to an item used to catch a moving object by operating the controllers 20. The item information 40 includes an attribute of the item (for example, parameter of item that contributes to catching of moving object).

The operation state information 41 is information indicating the operation state of each controller 20. The operation state information 41 includes information indicating the movement state including an operation speed that includes at least one of the speed, acceleration, and angular velocity of the controller 20, information indicating the tilted direction of the controller 20, information indicating whether or not the determination button of the controller 20 is operated, and the like. In the present embodiment, information indicating the operation state of the controller 20 is recorded for each controller 20 operated by the corresponding player.

The object catching history 42 includes information indicating the type of moving object that has been successfully caught by operating the controller 20. The object catching history 42 is managed as individual history data for each player.

An operation signal is input to the operation state determination unit 34 of the control unit 31 from the controller 20 operated by each player via the input/output unit 33. Further, the operation state determination unit 34 uses the input operation signal to determine the operation state of the controller 20 and record the determined operation state in the memory unit 32.

The game management unit 35 manages the progress made in the game by a player. More specifically, if the player first selects a game field, an avatar is arranged in the selected game field. Further, the game management unit 35 uses movement range information corresponding to the type of moving object included in the game field information 37 to determine the movement range of the moving object in the game field. In addition, the game management unit 35 performs a catch operation on the moving object moving in the movement range in the game field based on operation states of the controllers 20 determined by the operation state determination unit 34. If the catch operation on the moving object succeeds, the game management unit 35 adds the type and the like of the caught moving object to the object catching history 42. If the catch operation on the moving object fails, the game management unit 35 ends the game. Additionally, the game management unit 35 extracts, from an audio information memory (not shown), audio information such as a sound effect and an audio explaining the progress of the game and transmits audio information to the speaker 15 via the input/output unit 33.

The display control unit 36 determines an eyesight range in a virtual space centered about an attention position of each player and extracts the game field information 37 corresponding to the eyesight range. The display control unit 36 transmits the extracted game field information to the HMD 10 as an image signal. Further, the display control unit 36 displays the background of the game field selected by the player, an image of a moving object moving in the selected game field, and the like. In addition, the display control unit 36 displays, to each player, an avatar corresponding to the player in the game field.

[Operation Control]

Figure 2:
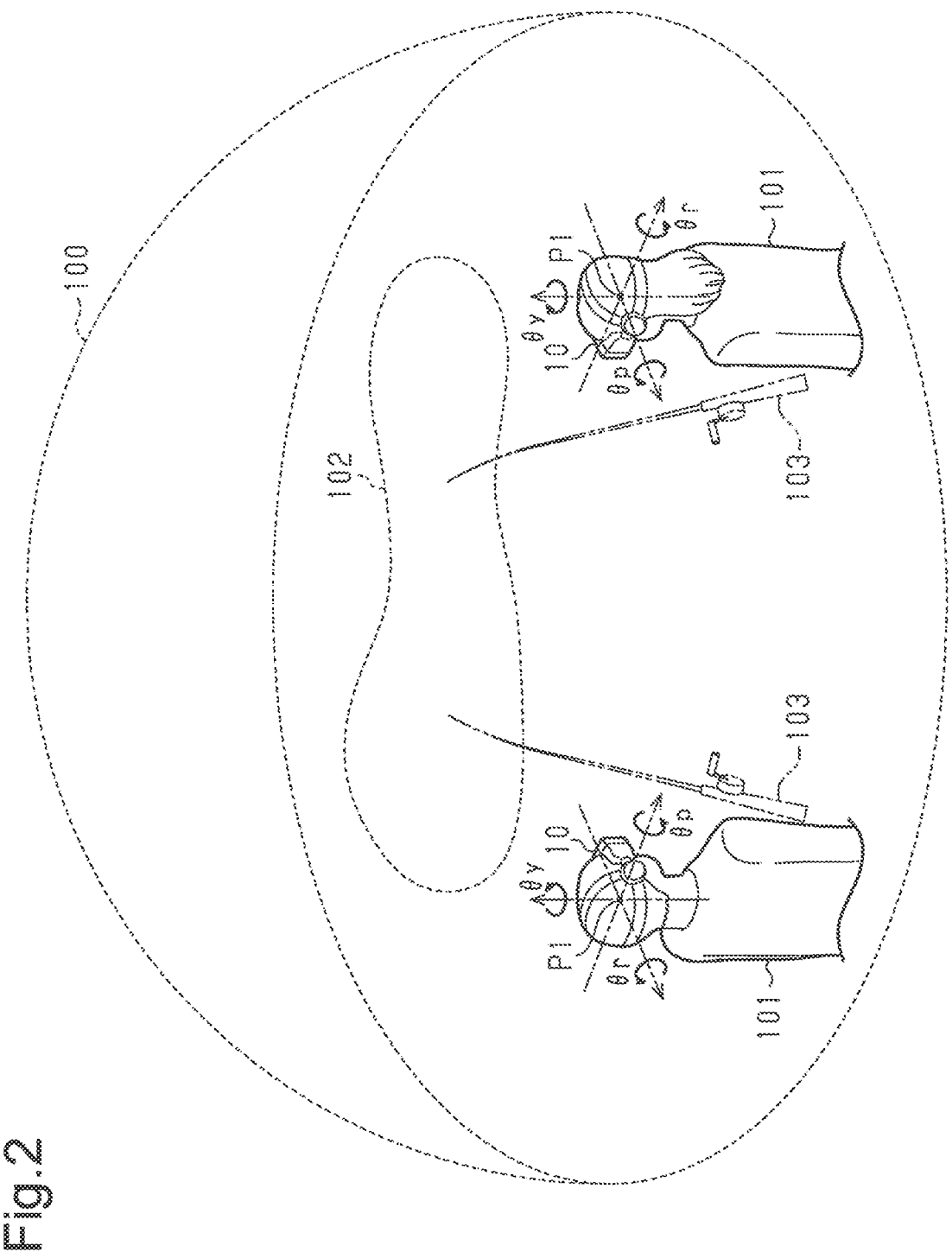
FIG. 2 is a conceptual diagram illustrating a virtual space of the first embodiment.

The determination function of an operation state of each controller 20 by the game processing device 30 will now be described with reference to FIG. 2. The operation state determination unit 34 determines the position and orientation of the head of a player 101 corresponding to a detection signal of the sensor 12 input from the HMD 10. More specifically, the operation state determination unit 34 calculates the position and orientation of the head as positions in three axes, namely, X-axis in a horizontal direction, Y-axis in a vertical direction, and Z-axis in a depth-wise direction, and angles about the three axes. A rotation angle about the X-axis is represented by a pitch $\theta p$, a rotation angle about the Y-axis is represented by a yaw $\theta y$, and a rotation angle about the Z-axis is represented by a roll $\theta r$. The operation state determination unit 34 determines the eyesight position of the player in a virtual space 100 based on the determined position and orientation of the head. The attention position in the virtual space may be determined by determining only the orientation of the head of the player. The "attention position" is a point of the coordinates or a region in the virtual space. Further, the method for determining the attention position is not limited to the method described herein.

Further, the operation state determination unit 34 determines the position and orientation of each controller 20 based on various information such as the input operation signal of the controller 20. More specifically, the operation state determination unit 34 calculates the position and orientation of the controller 20 as the positions in the three axes and the angles about the three axes in the same manner as the head of each player 101. The operation state determination unit 34 determines the operation state of the controller 20 as viewed from the viewpoint of the player 101 by comparing the determined position and orientation of the controller 20 with the position and orientation of the head of the player 101.

The display control unit 36 displays, at a position in the virtual space 100 corresponding to the controller 20, an image of an item 103 used to operate moving objects in a game field 102. In the present embodiment, an image of fishing rod used to catch moving objects is displayed near the hand of the player 101.

The virtual space is shared by two players 101. Thus, if operation performed by one of the players 101 is included in the eyesight range of the other one of the players 101, the display 14 of the latter player 101 displays the operation performed by the former player 101. Further, if operation performed by one of the players 101 causes a change in a moving object moving in the game field, the change is reflected on the display of the other one of the players 101.

[Game Process]

Each process for presenting a game to a player will now be described with reference to FIGS. 3 to 14. In the present embodiment, each process will be described as an example game for catching a moving object.

When the game starts, the control unit 31 of the game processing device 30 determines the position and orientation of the head corresponding to the detection signal input from the sensor 12 of the HMD 10. The control unit 31 determines an attention position of a player based on the position and orientation of the head. The control unit 31 extracts, from the memory unit 32, the game field information 37 of an eyesight range centered about the attention position. The control unit 31 also transmits, to the HMD controller 11, an image signal of a game field and a moving object that are included in the extracted game field information 37. The control unit 31 determines the position and orientation of the controller 20 corresponding to an operation signal input from the controller 20. The control unit 31 reads the item information 40 from the memory unit 32 and transmits, to the HMD controller 11, an image signal of an item included in the read item information 40. The HMD controller 11 outputs an image corresponding to the received image signal to the display 14. More specifically, the HMD controller 11 outputs, to the display 14, an image that displays the game field and the moving object at their respective predetermined positions in the virtual space. The HMD controller 11 outputs, to the display 14, an image in which an item is displayed at the position corresponding to the controller 20. In this manner, the game processing device 30 progresses the game while displaying, on the display 14, an image of the virtual space that corresponds to the position and orientation of the head of the player as well as the position and orientation of the controller 20.

[Game Progress Process]

Figure 3:
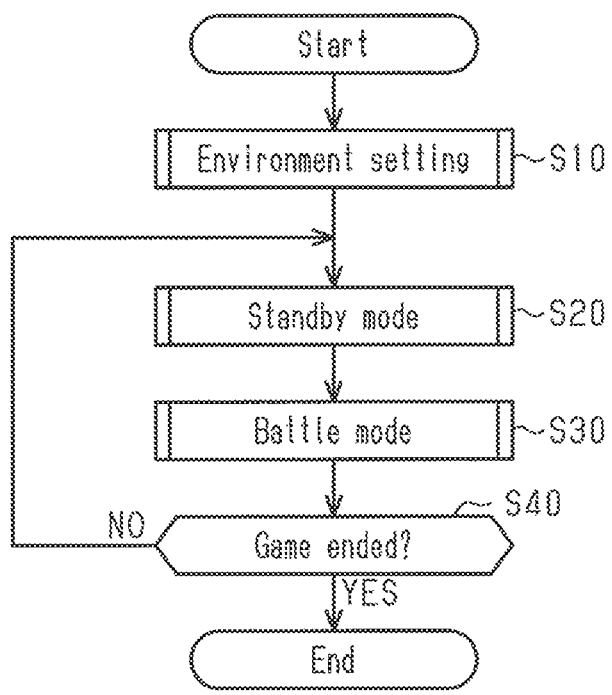
FIG. 3 is a flowchart illustrating a game progress process of the first embodiment.

The game progress process will now be described with reference to FIG. 3.

First, the control unit 31 of the game processing device 30 executes an environment setting of the game (step S10). When the game starts, the control unit 31 reads the game field information 37 from the memory unit 32. The process will be described later in detail with reference to FIG. 4.

Next, if the environment setting of the game is completed, the control unit 31 proceeds to a standby mode (step S20). If a predetermined starting event is detected in the standby mode, the control unit 31 proceeds to a battle mode (step S30). The process will be described in detail later with reference to FIGS. 8 and 9.

Then, the control unit 31 determines whether or not the player has performed a game ending operation after the battle mode ends (step 40).

If the game ending operation has not been performed ("NO" in step S40), the control unit 31 returns to step S20. If the game ending operation has been performed ("YES" in step S40), the control unit 31 causes the game to be ended.

[Environment Setting of Game]

Figure 4:
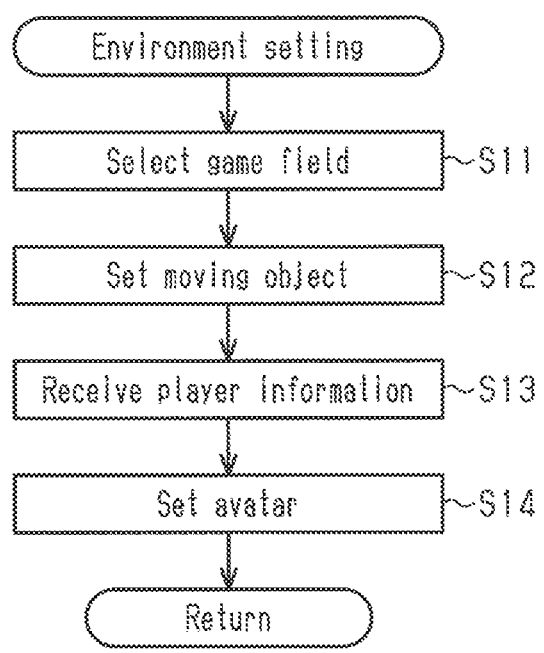
FIG. 4 is a flowchart illustrating an environment setting process of the first embodiment.

The environment setting of the game will now be described with reference to FIG. 4. First, based on an operation signal input from the controller 20, the control unit 31 of the game processing device 30 selects a game field selected by a player from a plurality of game fields that are prepared in advance (step S11).

Next, the control unit 31 sets a moving object for the selected game field (step S12). More specifically, the game management unit 35 of the control unit 31 determines the type of moving object corresponding to the selected game field based on the game field information 37. Further, the game management unit 35 extracts, from the moving object information 39, movement range information used to set a movement range of the determined moving object. The control unit 31 determines the movement range of the moving object in the game field based on the extracted movement range information.

Subsequently, the control unit 31 receives player information (step S13). More specifically, the control unit 31 determines the number of players and a player ID for each player based on an operation signal input from the corresponding controller 20.

Then, the control unit 31 sets an avatar (step 14). More specifically, the game management unit 35 of the control unit 31 reads the avatar information 38 from the memory unit 32 and sets an avatar for each player. Further, the game management unit 35 extracts, from the game field information 37, information related to an initial position for the avatar corresponding to the selected game field. In this case, a plurality of positions are set in advance as the initial position for the avatar in the game field, and each position is determined based on movement ranges of moving objects. More specifically, the relative position of the avatar and a moving object is determined so that the distance from the initial position for the avatar to the movement range of the moving object is smaller than a predetermined distance. Thus, the movement range of at least one of the moving objects moving in the game field 102 is located proximate to the initial position for every one of the avatars. The control unit 31 randomly selects the initial position for an avatar for each player from the initial positions for the avatar corresponding to the game field. Alternatively, the control unit 31 selects the position designated by a player from the initial positions for the avatar.

The virtual space that is set through the environment setting of the game will now be described with reference to FIG. 5. The virtual space in FIG. 5 is schematically shown irrelevant to the eyesight range of a player.

Figure 5:
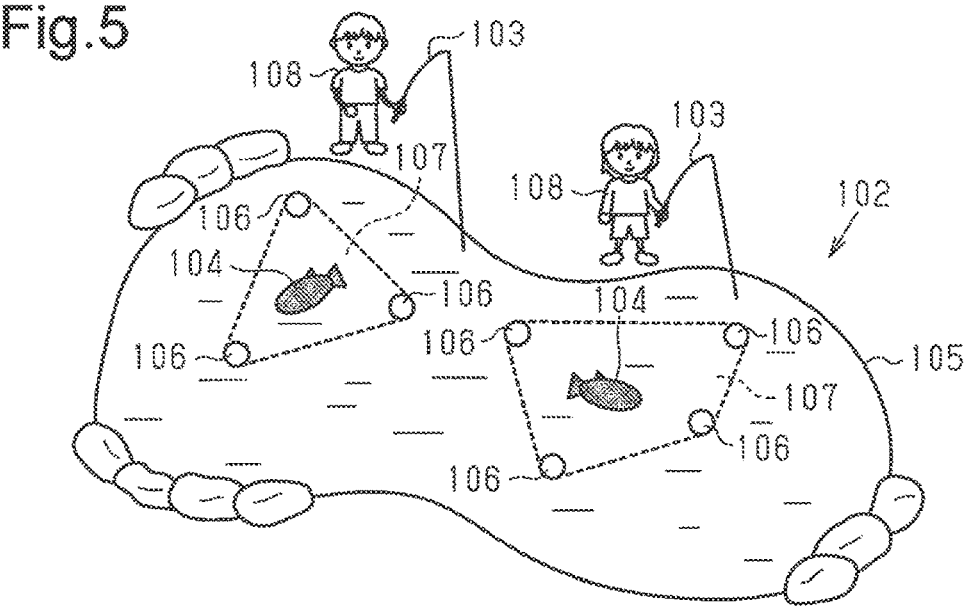
FIG. 5 is a conceptual diagram illustrating avatars displayed in a game field of the first embodiment.

As shown in FIG. 5, a movable range 105 of moving objects 104 are set in the game field 102 selected by two players. In the present embodiment, a fishing spot corresponds to the game field 102, fish correspond to the moving objects 104, and a pond corresponds to the movable range 105 of the moving objects 104. Movement target positions 106 of the moving objects 104 are set for the movable range 105 of the moving objects 104 based on the moving object information 39. The number, arrangement, and movement probability of the movement target positions 106 (i.e., probability of a moving object 104 moving to each movement target position 106) differ depending on the type of the moving object 104. The range surrounded by the movement target positions 106 corresponds to a movement range 107 of each moving object 104. When a fish, which is the moving object 104, exists in a pond (or river, sea, and the like), which is the movable range 105, the fish is displayed by a fish outline.

Further, the game field 102 displays avatars 108 that are respectively set for the players. The movement range 107 of at least one of the moving objects 104 moving in the game field 102 is arranged to be included in the vicinity of the initial position for each avatar 108. In the present embodiment, two moving objects 104 wander in the game field 102, and the movement range 107 of one of the two moving objects 104 is arranged in the proximity of each of the avatars 108 of two players. This allows the two players to immediately start catching operation of moving objects 104 and smoothly progress the game without changing the positions of their avatars 108 from when the game starts.

[Standby Mode]

Figure 6:
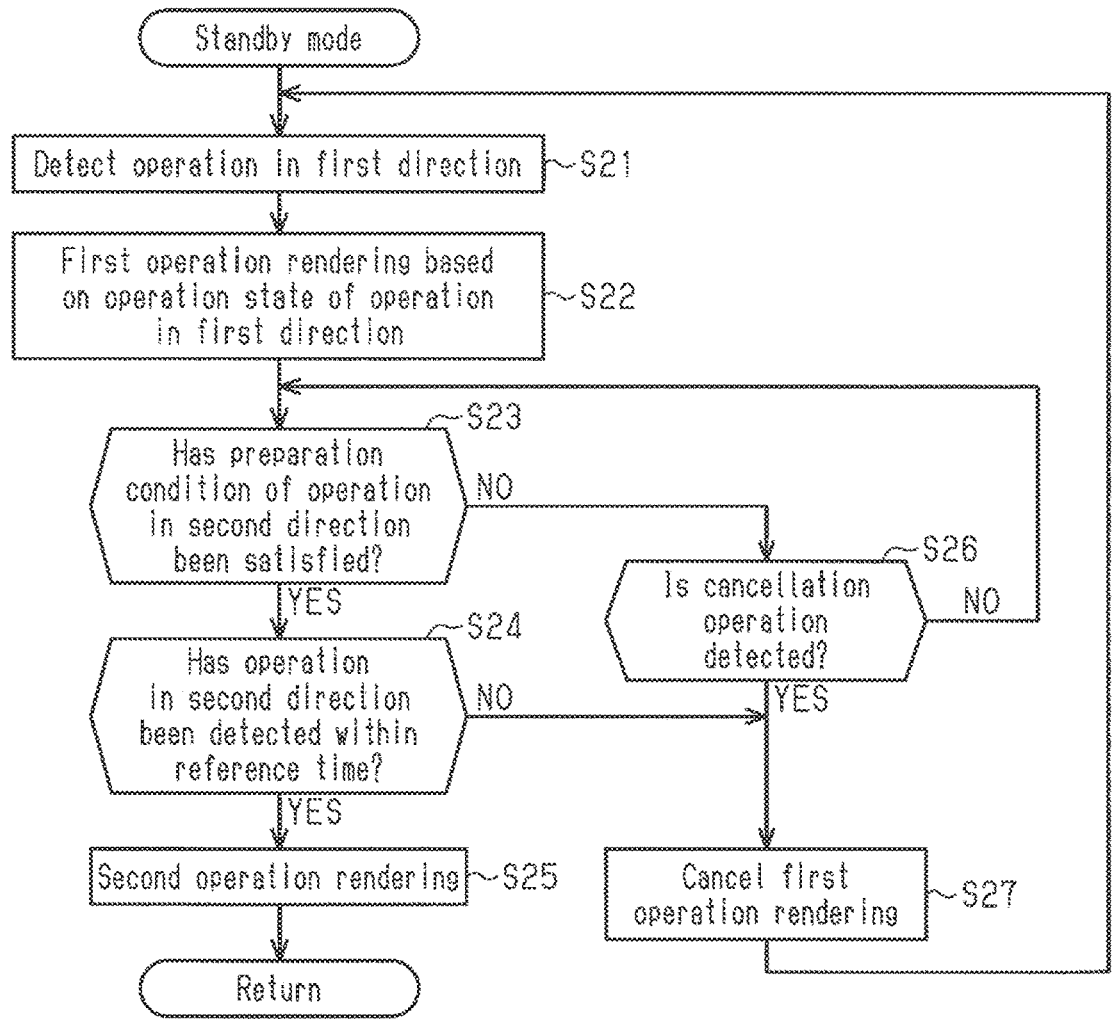
FIG. 6 is a flowchart illustrating a standby mode process of the first embodiment.

The standby mode will now be described with reference to FIG. 6.

First, the control unit 31 of the game processing device 30 detects operation performed in a first direction (step S21). More specifically, the operation state determination unit 34 of the control unit 31 detects a swing-down operation of the controller 20, as the operation performed in the first direction, from an operation signal input from the controller 20.

Next, the control unit 31 executes a first operation rendering based on the operation state of the operation of the controller 20 in the first direction (step S22). More specifically, the display control unit 36 of the control unit 31 arranges, in the game field, an item related to a catch operation performed on a moving object as the first operation rendering. The operation state of the operation performed in the first direction includes the operation speed and orientation of the operation of the controller 20 in the first direction. If an item is arranged in the game field, the control unit 31 controls the catching operation of the moving object to be ready to start.

Then, the control unit 31 determines whether or not a preparation condition of the operation of the controller 20 in a second direction has been satisfied (step S23). In the present embodiment, a swing-up operation of the controller 20 is used as the operation performed in the second direction.

More specifically, if the relative positions of a moving object and an item in the game field become closer and less than or equal to a predetermined distance, the operation state determination unit 34 of the control unit 31 associates the moving object with the item and determines that the preparation condition of the operation performed in the second direction has been satisfied.

If the control unit 31 determines that the preparation condition of the operation performed in the second direction has been satisfied ("YES" in step S23), the control unit 31 determines whether or not the controller 20 has been operated in the second direction within a reference time (step S24). More specifically, the operation state determination unit 34 of the control unit 31 waits for the operation performed in the second direction while measuring the time from when the preparation condition of the operation performed in the second direction is satisfied.

If the control unit 31 determines that the controller 20 has been operated in the second direction within the reference time ("YES" in step S24), the control unit 31 executes a second operation rendering (step S25). More specifically, the display control unit 36 of the control unit 31 outputs, to the HMD 10, an operation rendering that displays a message indicating shifting to the battle mode in the vicinity of a moving object.

If the control unit 31 determines that the preparation condition of the operation of the controller 20 performed in the second direction has not been satisfied ("NO" in step S23), the control unit 31 determines whether or not a cancellation operation has been performed (step S26). More specifically, the operation state determination unit 34 of the control unit 31 waits for, as the cancellation operation, the swing-up operation of the controller 20 based on an operation signal input from the controller 20 that is operation performed in a direction opposite to the first direction.

If the cancellation operation is detected ("YES" in step S26), the control unit 31 cancels the first operation rendering (step S27) and returns to step S21.

If the cancellation operation is not detected ("NO" in step S26), the control unit 31 returns to step S23 while continuing the first operation rendering.

Further, the control unit 31 determines that the controller 20 has not been operated in the second direction within the reference time ("NO" in step S24), cancels the first operation rendering (step S27) and returns to step S21 in the same manner.

The image displayed on the display 14 of the HMD 10 during execution of the standby mode will now be described with reference to FIGS. 7A to 7D.

Figure 7A:
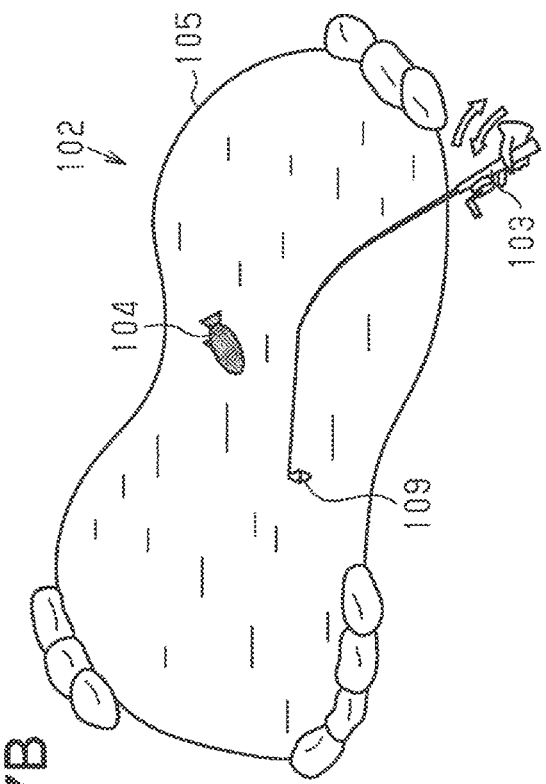
FIGS. 7A to 7D are schematic diagrams each illustrating an image displayed on a display during execution of the standby mode of the first embodiment.

As shown in FIG. 7A, the control unit 31 of the game processing device 30 displays, on the display 14, an image of the virtual space in which the attention position of the player is located at the center of the eyesight range. In this case, the display control unit 36 of the control unit 31 displays, as the image of the virtual space, the game field 102, the moving object 104 (fish) moving in the game field 102, and the item 103 (fishing rod) associated with operation of the controller 20.

Figure 7C:
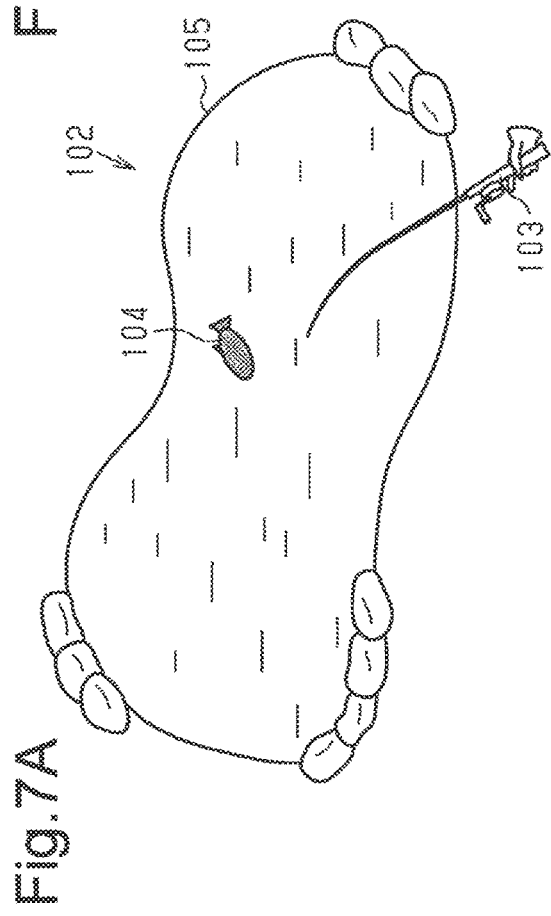
Figure 7B:
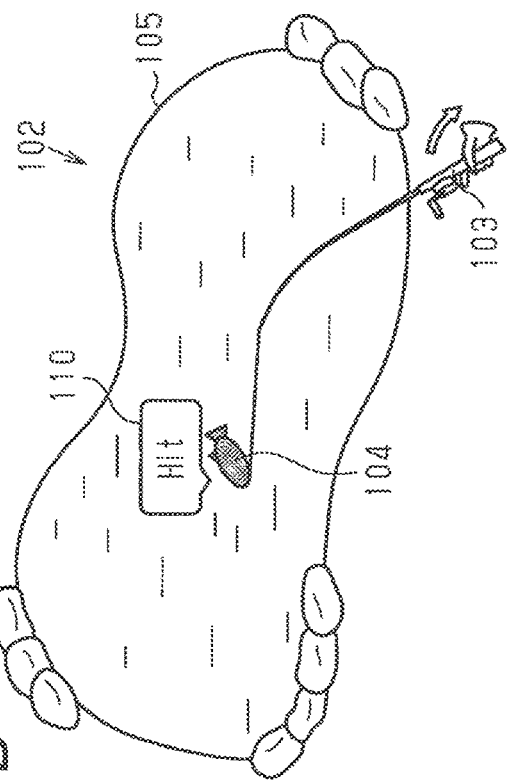

As shown in FIG. 7B, if the operation of the controller 20 in the first direction is detected, the control unit 31 executes the first operation rendering in which the item 109 (lure or bait) is arranged in the movable range 105 of the moving object 104, which is set in the game field 102 as a set region. In the present embodiment, as the first operation rendering, a video is output in which a lure is thrown into a water surface of the pond from the head of the fishing rod.

In this case, the control unit 31 determines the position of the item 109 in the game field 102 based on a movement state (operation speed, orientation) of the controller 20 in the operation performed in the first direction. More specifically, the game management unit 35 of the control unit 31 arranges the item 109 at a farther position as viewed from the viewpoint of the player for a higher speed or higher acceleration of the controller 20 in the operation performed in the first direction (swing-down operation). In this case, the item 109 is arranged at a point on an extension line lying in the operation direction (swing-down direction), which is the first direction as viewed from the viewpoint of the player.

Further, as shown in FIG. 7C, if the relative positions of the moving object 104 and the item 109 (for example, lure) in the game field 102 are proximate, the control unit 31 determines whether or not the moving object 104 is associated with the item 109 based on the affinity of the moving object 104 and the item 109. More specifically, the game management unit 35 of the control unit 31 determines battle start (association of moving object 104 with item 109) based on the affinity of a fish and a lure or the like. The affinity of the bait set to the lure with the type of fish affects whether or not "hooking" in which the fish bites the lure has succeeded.

Further, if the moving object 104 and the item 109 are associated with each other, the control unit 31 issues a notification to the player. In this case, one example of a notification is to vibrate the controller 20 with a vibration function incorporated in the controller 20. However, the notification is not limited to the vibration. Instead, a message may be displayed in the vicinity of the moving object 104 in the image of the virtual space.

Figure 7D:
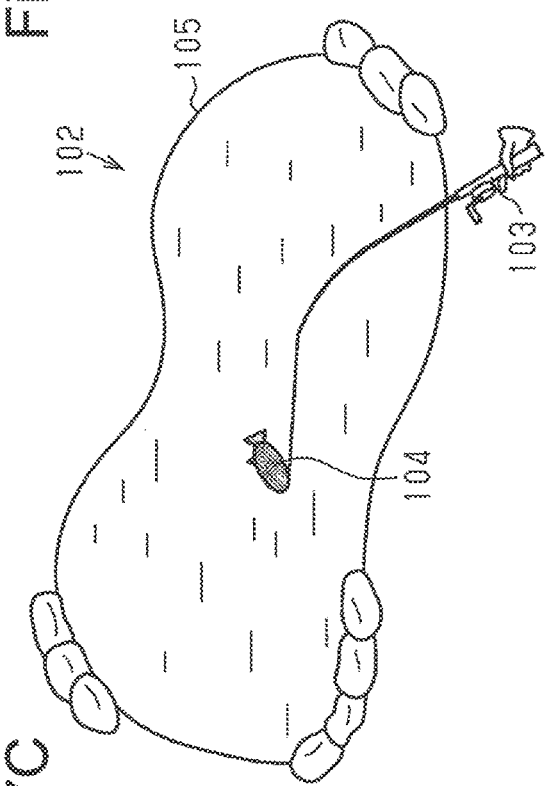

Further, as shown in FIG. 7D, if the operation of the controller 20 in the second direction is detected, the control unit 31 displays a message 110 indicating shifting to the battle mode in the vicinity of the moving object 104.

[Battle Mode]

The battle mode will now be described with reference to FIGS. 8 and 9. In the present embodiment, the battle mode is a catching operation performed on the moving object 104 using the item 103 (fishing rod) and corresponds to a game operation using the item 103.

Figure 8:
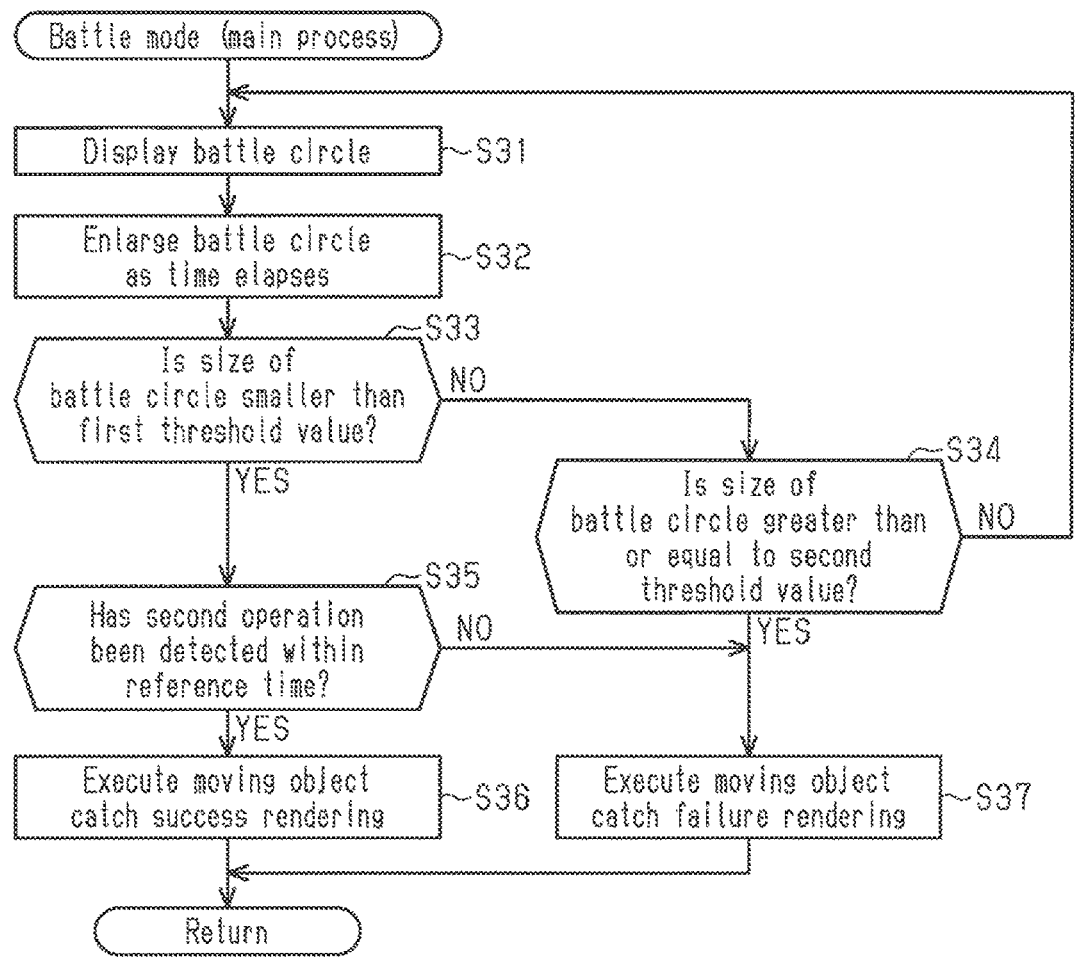
FIG. 8 is a flowchart illustrating a main process for a battle mode of the first embodiment.

First, as shown in FIG. 8, in a main process for the battle mode, the control unit 31 of the game processing device 30 displays a battle circle (step S31). More specifically, the game management unit 35 of the control unit 31 displays the battle circle (first region) within the movable range of the moving object, which is set in the game field. The battle circle (first region) is a range in which a tap operation (first operation) performed on the determination button of the controller 20 is valid. Further, the size of the battle circle serves as an index indicating the health of the moving object or the probability of encountering an opportunity to catch the moving object.

Next, the control unit 31 enlarges the battle circle as time elapses (step S32). More specifically, the game management unit 35 of the control unit 31 enlarges the diameter from the center of the battle circle as time elapses. The battle circle does not have to be circular as long as it is enlarged including the previous battle circle.

Then, the control unit 31 determines whether or not the size of the battle circle is smaller than a first threshold value (step S33). More specifically, as described below, if an interrupt process for the battle mode is executed during enlargement of the battle circle, the game management unit 35 of the control unit 31 contracts the battle circle. The game management unit 35 compares the diameter of the battle circle with the first threshold value (lower limit threshold value).

If the control unit 31 determines that the size of the battle circle is greater than or equal to the first threshold value ("NO" in step S33), the control unit 31 determines whether or not the size of the battle circle is greater than or equal to a second threshold value (step S34). More specifically, the game management unit 35 of the control unit 31 compares the diameter of the battle circle with the second threshold value (upper limit threshold value). The second threshold value is set as a value larger than the first threshold value.

If the control unit 31 determines that the size of the battle circle is smaller than the second threshold value ("NO" in step S34), the control unit 31 returns to step S31. More specifically, if the size of the battle circle is between the first threshold value and the second threshold value, the game management unit 35 of the control unit 31 repeats the processes of step S31 to step S34.

If the control unit 31 determines that the size of the battle circle is smaller than the first threshold value ("YES" in step S33), the control unit 31 determines whether or not the second operation of the controller 20 has been performed within the reference time (step S35). More specifically, the operation state determination unit 34 of the control unit 31 waits for detection of the operation that swings up the controller 20 to catch the moving object (second operation).

If the second operation has been detected within the reference time ("YES" in step S35), the control unit 31 executes a catch success rendering of the moving object (step S36). More specifically, the display control unit 36 of the control unit 31 outputs, to the HMD 10, a rendering in which a fish is lifted out from the water surface as the catch success rendering.

If the control unit 31 determines that the size of the battle circle is greater than or equal to the second threshold value ("YES" in step S34), the control unit 31 performs a catch failure rendering of the moving object (step S37). More specifically, the display control unit 36 of the control unit 31 outputs, to the HMD 10, a rendering in which a fish is separated from the fishing rod as the catch failure rendering.

In addition, if the second operation of the controller 20 has not been detected within the reference time ("NO" in step S35), the control unit 31 performs the catch failure rendering of the moving object (step S37).

Figure 9:
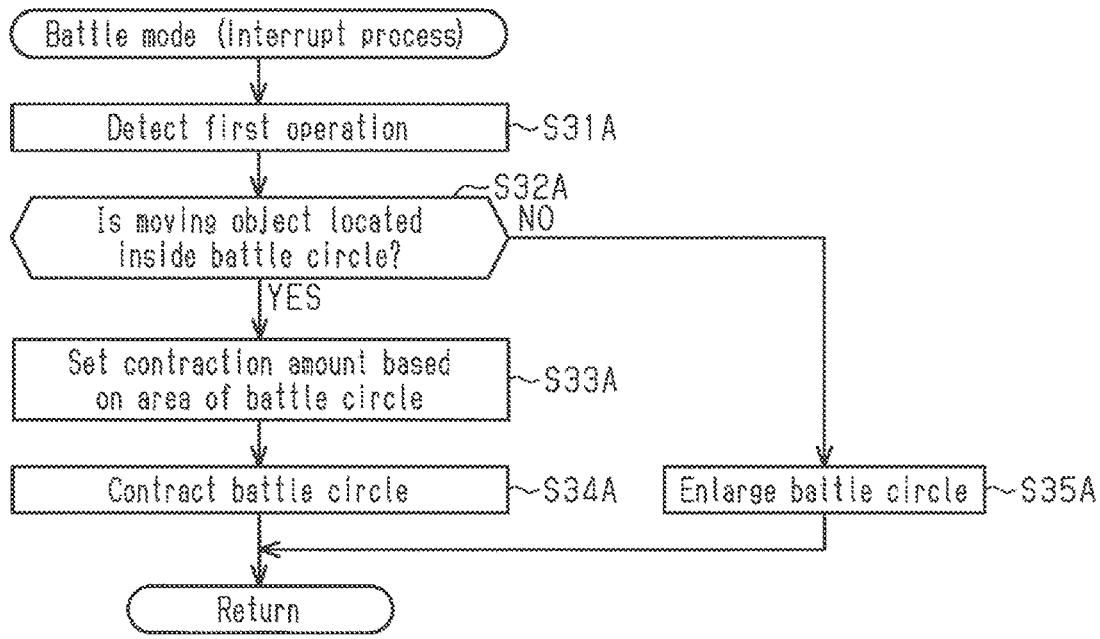
FIG. 9 is a flowchart illustrating an interrupt process for the battle mode of the first embodiment.

Further, as shown in FIG. 9, if the first operation of the controller 20 is detected during the execution of the processes of step S31 to step S34 in the main process for the battle mode (step S31A), the control unit 31 executes the interrupt process for battle mode.

In the interrupt process for the battle mode, the control unit 31 changes the size of the battle circle based on the validity of the first operation of the controller 20.

First, at the point in time when the first operation is detected, the control unit 31 determines whether or not the moving object is located inside the battle circle (step S32A). More specifically, the operation state determination unit 34 of the control unit 31 determines a current position of the moving object to compare the current position with the location of the battle circle.

If the moving object is located inside the battle circle ("YES" in step S32A), the control unit 31 determines that the first operation of the controller 20 is valid.

In this case, the control unit 31 determines the contraction amount of the battle circle (step S33A). More specifically, the game management unit 35 of the control unit 31 determines the contraction amount of the battle circle at a ratio that has been determined in advance for each area of the battle circle.

Then, the display control unit 36 of the control unit 31 contracts the battle circle on the display 14 in correspondence with the determined contraction amount (step S34A) and ends the interrupt process for the battle mode.

If the moving object is located outside the battle circle ("NO" in step S32A), the control unit 31 determines that the first operation is invalid.

In this case, the control unit 31 enlarges the battle circle in correspondence with the first operation (step S35A) and ends the interrupt process for the battle mode.

The image displayed on the display 14 of the HMD 10 during the execution of the battle mode will now be described with reference to FIGS. 10A to 10D and FIGS. 11A and 11C.

Figure 10A:
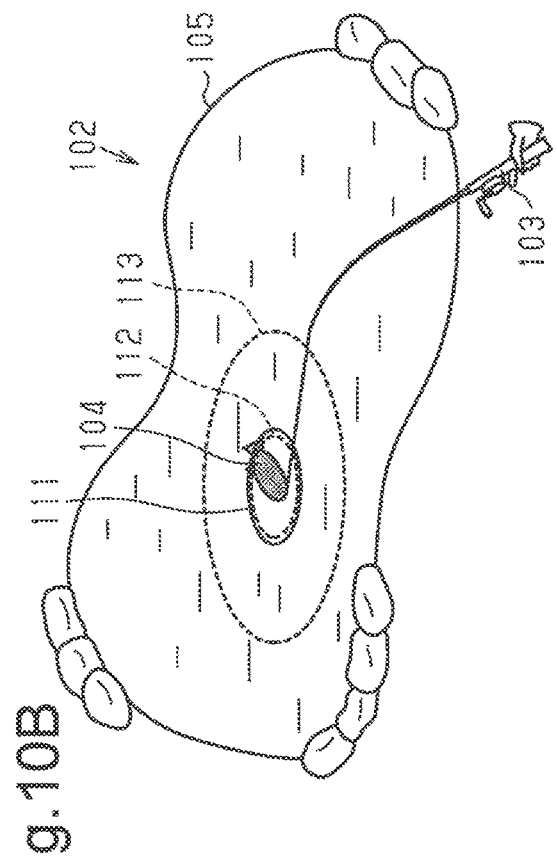
FIGS. 10A to 10D are schematic diagrams each illustrating an image displayed on the display during the execution of the battle mode of the first embodiment.

As shown in FIG. 10A, the control unit 31 of the game processing device 30 displays, on the display 14, an image of the virtual space in which the attention position of the player is located at the center of the eyesight range in the same manner as during the execution of the standby mode. In this case, the control unit 31 displays, as the image of the virtual space, the battle circle 111 centered about the position of the moving object 104 (fish) in the game field 102. Further, the control unit 31 displays, inside the battle circle 111, a central circle 112 (second region) indicating the lower limit threshold value of the size of the battle circle 111. In addition, the control unit 31 displays, outside the battle circle 111, an outer circle 113 indicating the upper limit threshold value of the size of the battle circle 111. The central circle 112 and the outer circle 113 are concentric with the battle circle 111.

The control unit 31 enlarges the battle circle 111 as time elapses. In this case, the control unit 31 changes an enlargement amount of the battle circle 111 as time elapses based on the type of the moving object 104 and the type of the item 103 (fishing rod), which is associated with operation of the controller 20.

For example, for a moving object 104 having a high degree of rarity, a larger amount is set to the enlargement amount of the battle circle 111 as time elapses. This can increase the difficulty for catching the moving object 104.

Figure 10B:
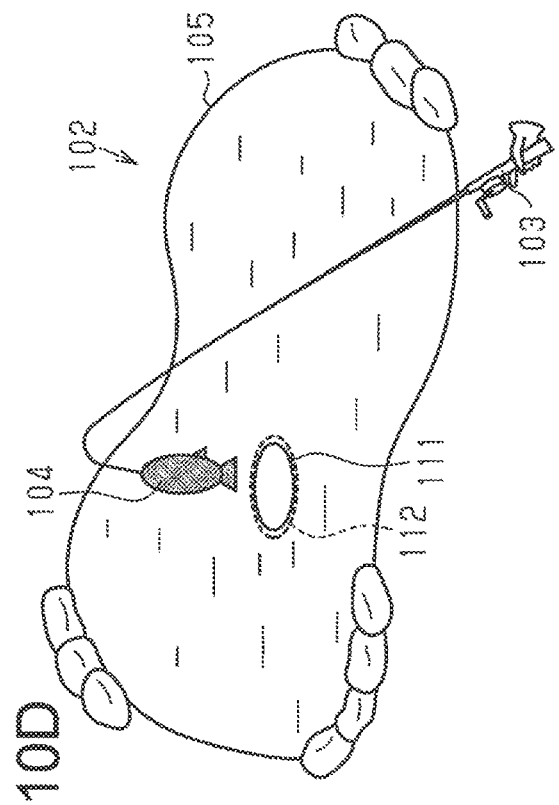

In addition, as shown in FIG. 10B, if the first operation (tap operation) of the controller 20 is detected in a state in which the moving object 104 is located inside the battle circle 111, the control unit 31 contracts the battle circle 111. In this case, based on the area in the battle circle 111 where the moving object 104 is located, the control unit 31 changes the contraction amount of the battle circle 111 corresponding to the validity of the first operation of the controller 20.

More specifically, the control unit 31 divides the battle circle 111 into a plurality of concentric areas in the radial direction and sets a contraction amount of the battle circle 111 for each area. In this case, the control unit 31 sets a larger contraction amount of the battle circle 111 to the area as the area becomes closer to the center of the battle circle 111.

Further, the control unit 31 changes the contraction amount of the battle circle in correspondence with the validity of the first operation of the controller 20 based on the type of the moving object 104 and the type of the item 103.

For example, for a moving object 104 having a high degree of rarity, a smaller amount is set to the contraction amount of the battle circle 111 if the first operation of the controller 20 is valid. This can increase the difficulty for catching the moving object 104.

Figure 10C:
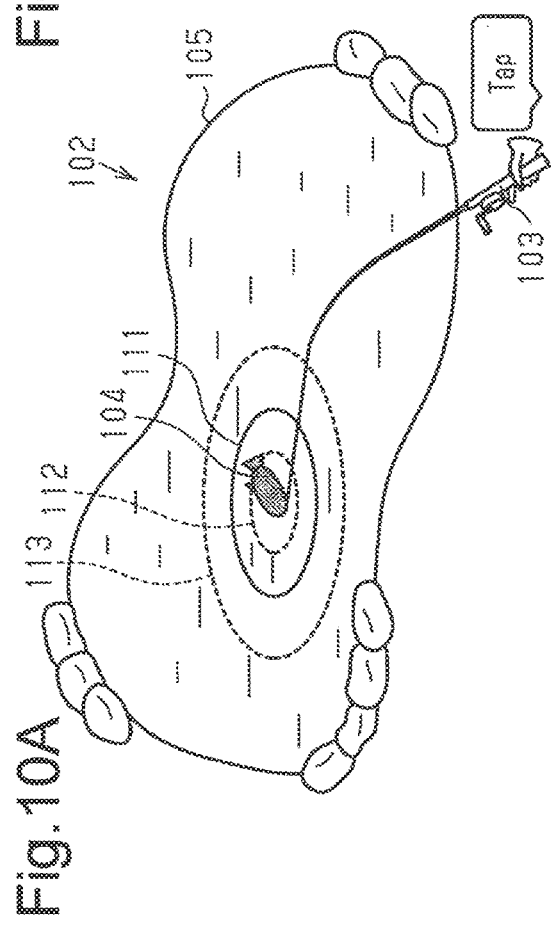

In addition, as shown in FIG. 10C, if the battle circle 111 is contracted to the central circle 112, the control unit 31 issues a notification indicating that the second operation of the controller 20 is valid. For example, the control unit 31 displays a message 114 in the vicinity of the moving object 104. The notification may also be, for example, a method using the vibration function incorporated in the controller 20.

If the second operation of the controller 20 is detected, the control unit 31 determines the validity of the operation. In this case, the validity of the second operation of the controller 20 is affected by a parameter of the item 103 (fishing rod) related to the second operation of the controller 20 that contributes to the difficulty for catching the moving object. The ratio in which a valid determination of the second operation of the controller 20 is given increases in correspondence with the level of the parameter of the item 103. This can lower the difficulty for catching the moving object 104 when, for example, an item 103 having a high degree of rarity is used.

Figure 10D:
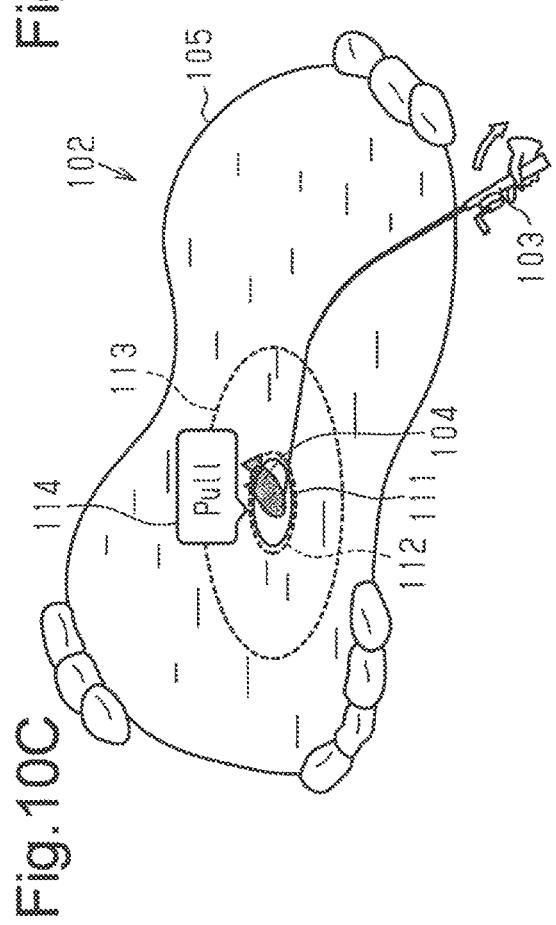

As shown in FIG. 10D, if the control unit 31 determines that the second operation of the controller 20 is valid, the control unit 31 performs the catch success rendering of the moving object 104. More specifically, the display control unit 36 of the control unit 31 outputs the rendering in which a fish is lifted out from the water surface to the HMD 10 as the catch success rendering.

In addition, as shown in FIGS. 11A and 11B, if the first operation (tap operation) of the controller 20 is detected in a state in which the moving object 104 is located outside the battle circle 111, the control unit 31 enlarges the battle circle 111. In this case, based on the type of the moving object 104, the type of the item 103 (fishing rod), which is associated with the first operation of the controller 20, and the like, the control unit 31 changes the enlargement amount of the battle circle 111 corresponding to the validity of the first operation of the controller 20.

For example, for a moving object 104 having a high degree of rarity, a large enlargement amount is set for the battle circle 111 if the first operation of the controller 20 is invalid. This can increase the difficulty for catching the moving object 104.

As shown in FIG. 11O, if the battle circle 111 is enlarged to the outer circle 113, the control unit 31 performs the catch failure rendering of the moving object 104. More specifically, the display control unit 36 of the control unit 31 outputs the rendering in which a fish is separated from the fishing rod to the HMD 10 as the catch failure rendering. If the control unit 31 determines that the second operation of the controller 20 is invalid, the control unit 31 performs the catch failure rendering of the moving object 104 in the same manner.

[Moving Object Setting]

Figure 12:
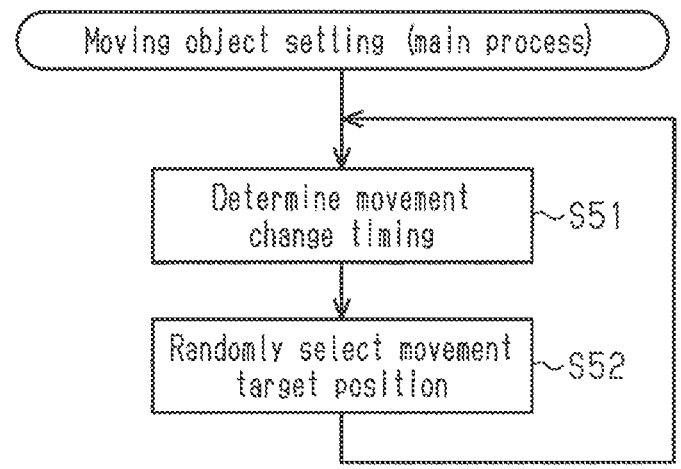
FIG. 12 is a flowchart illustrating the procedures for a main process for a moving object setting of the first embodiment.
Figure 13:
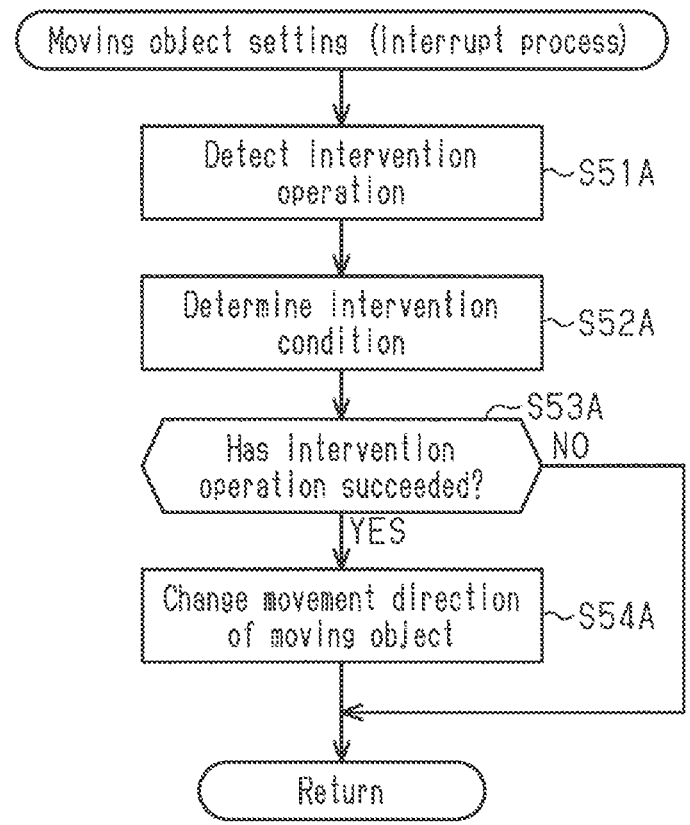
FIG. 13 is a flowchart illustrating the procedures for an interrupt process for the moving object setting of the first embodiment.

A moving object setting will now be described with reference to FIGS. 12 and 13. A main process for the moving object setting shown in FIG. 12 is executed in both the standby mode and the battle mode. An interrupt process for the moving object setting shown in FIG. 13 is executed only in the battle mode and accepted during the execution of step S31 to step S34 in the main process for the battle mode. That is, in the present embodiment, in a state in which the second operation of the controller 20 is accepted as an operation state of the moving object, the interrupt process for the moving object setting is not accepted. In this regard, the control unit 31 of the game processing device 30 determines whether or not the moving direction of the moving object can be changed based on the operation state of the moving object.

[Main Process for Moving Object Setting]

First, as shown in FIG. 12, in the main process for the moving object setting, the control unit 31 determines a movement change timing (step S51). More specifically, the game management unit 35 of the control unit 31 sets the movement change timing at predetermined time intervals. The game management unit 35 waits for the movement change timing.

Next, the control unit 31 randomly selects a movement target position (step S52). More specifically, the game management unit 35 of the control unit 31 uses the moving object information 39 to determine, in the game field, candidates of a plurality of movement target positions corresponding to the type of the moving object 104. Further, the game management unit 35 uses the moving object information 39 to determine the movement probability of the moving object 104 for each candidate of the movement target position. The game management unit 35 randomly selects the movement target position, which is a movement destination of the moving object, based on the movement probability for each candidate of the movement target position.

The game management unit 35 starts moving the moving object 104 from the current position on a straight line connecting the current position to a newly determined movement target position. In this case, the display control unit 36 of the control unit 31 outputs a display to the HMD 10 that causes the moving object 104 to wander to the movement target position. Subsequently, the control unit 31 returns to step S51 and waits for the next movement change timing.

[Interrupt Process for Movement Object Setting]

As shown in FIG. 13, if an intervention operation of the controller 20 is detected during the execution of the main process for the moving object setting (step S51A), the control unit 31 executes the interrupt process for the moving object setting. That is, the intervention operation is executed under the assumption that the moving object and the item have been associated ("hooking" has succeeded). Further, the intervention operation is executed when the player changes the position or orientation of the controller 20.

In the interrupt process for the moving object setting, the control unit 31 changes the movement direction of the moving object based on the direction of the intervention operation of the controller 20.

First, the control unit 31 determines an intervention condition (step S52A). More specifically, the game management unit 35 of the control unit 31 determines the intervention condition using the type of moving object of the moving object information 39, the type of item of the item information 40, and the like.

Next, the control unit 31 determines whether or not the intervention operation of the controller 20 has succeeded (step S53A). More specifically, as the difficulty for catching the moving object becomes higher, the game management unit 35 of the control unit 31 decreases the probability of the intervention operation of the controller 20 determined as being successful. Further, as the parameter of the item that contributes to catching of the moving object becomes higher, the game management unit 35 increases the probability of the intervention operation of the controller 20 determined as being successful. In addition, when the acceleration or speed of the controller is greater than or equal to a predetermined value, the game management unit 35 may determine that the intervention operation has succeeded.

If the control unit 31 determines that the intervention operation of the controller 20 has succeeded ("YES" in step S53A), the control unit 31 changes the movement direction of the moving object (step S54A). More specifically, the game management unit 35 of the control unit 31 causes the direction of the intervention operation of the controller 20 to match the changed movement direction of the moving object.

If the control unit 31 determines that the intervention operation of the controller 20 has not succeeded ("NO" in step S53A), the control unit 31 ends the interrupt process for the moving object setting without changing the moving direction of the moving object.

The image displayed on the display 14 of the HMD 10 during the execution of the moving object setting will now be described with reference to FIGS. 14A to 140.

Figure 14A:
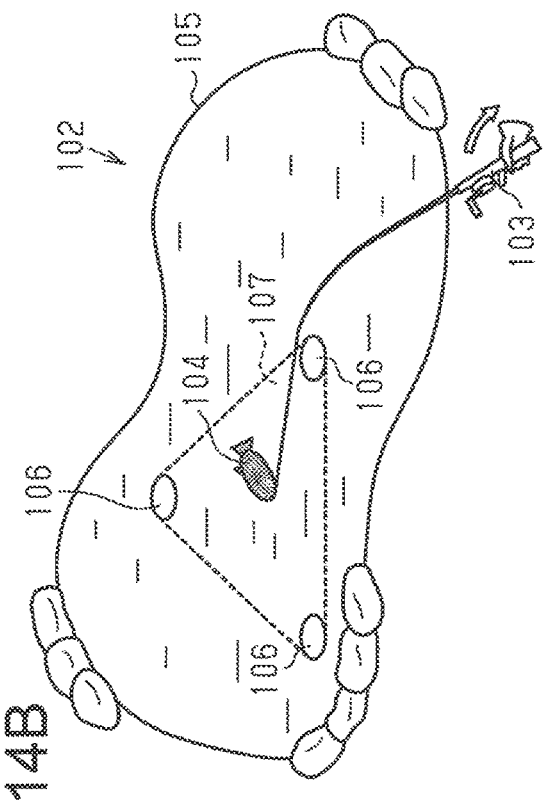
FIGS. 14A to 14C are schematic diagrams each illustrating an image displayed on the display during the execution of the moving object setting of the first embodiment.

As shown in FIG. 14A, the control unit 31 of the game processing device 30 moves the moving object 104 toward a predetermined one of a plurality of movement target positions 106 corresponding to the type of the moving object 104 in the game field 102. The control unit 31 randomly selects a subsequent movement target position at predetermined time intervals based on the movement probability of each movement target position 106. That is, the control unit 31 regularly changes the movement direction of the moving object 104 within the movement range 107, which is surrounded by the movement target positions 106.

Figure 14B:
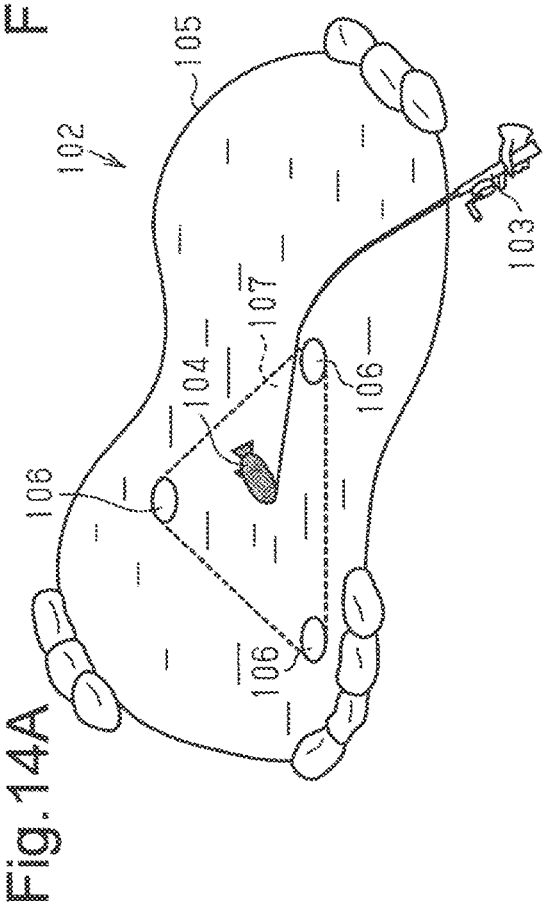
Figure 14C:
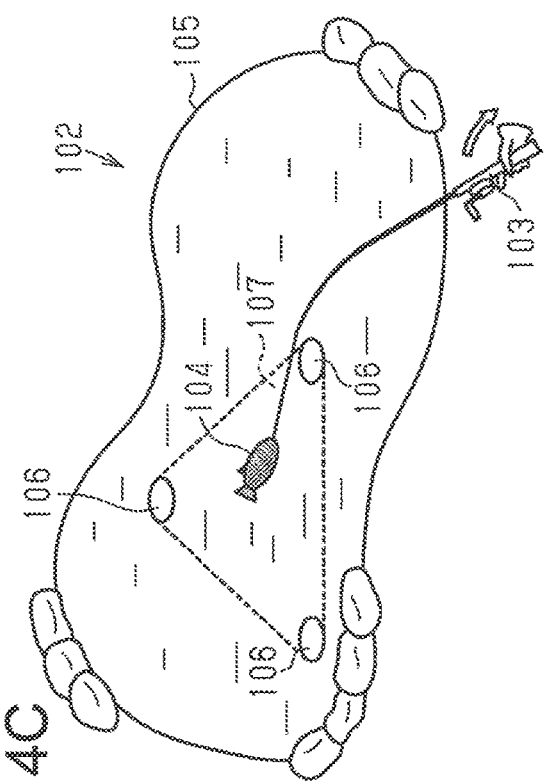

As shown in FIG. 14B, if the intervention operation of the controller 20 is detected, the control unit 31 determines whether or not the intervention operation of the controller 20 has succeeded. More specifically, the game management unit 35 of the control unit 31 determines whether or not the intervention operation of the controller 20 has succeeded based on the type of moving object, the type of the item 103 (fishing rod) associated with the intervention operation of the controller 20, and the like.

As shown in FIG. 140, if the control unit 31 determines that the intervention operation of the controller 20 has succeeded, the control unit 31 changes the movement direction of the moving object 104 based on the direction of the intervention operation of the controller 20. In this case, the changed direction of the moving object 104 is affected by the type of the moving object 104, the type of the item 103 (fishing rod) associated with the intervention operation of the controller 20, and the like.

For example, for a moving object 104 having a high degree of rarity, the degree of matching is low for the direction of the intervention operation of the controller 20 and the changed movement direction of the moving object 104. This can increase the difficulty for catching the moving object 104.

The control unit 31 may perform the intervention operation of the controller 20 to move the moving object 104 to a position located outside the movement range 107 that is set based on the movement range information.

Further, the control unit 31 does not accept the intervention operation of the controller 20 immediately after the movement direction of the moving object 104 is changed by the intervention operation of the controller 20. The control unit 31 resumes changing of the movement direction of the moving object 104 by the intervention operation of the controller 20 under the condition that a predetermined time has elapsed from when the movement direction of the moving object 104 was changed.

As described above, the first embodiment has the following advantages.

(1) in the first embodiment, the movement range information is used to determine the movement range 107 of the moving object 104 in the game field 102. The avatar 108 is arranged in the game field so that the relative positions of the avatar and the determined movement range 107 satisfy a predetermined condition. As a result, the moving object 104 moves in a complicated manner. Thus, when, for example, the moving object 104 is a fish, the movement is further close to that of a real fish. Further, the avatar 108 in the game field 102 and the movement range of the moving object 104 are properly arranged in order for the game to smoothly progress.

(2) In the first embodiment, a subsequent movement target position 106 is randomly selected from a plurality of movement target positions 106 set to the memory unit 32 at the movement change timing. Thus, the moving object 104 in the game field 102 has a wide variety of movement patterns.

(3) In the first embodiment, the movement change timing is set at predetermined time intervals. This regularly changes the movement direction of the moving object 104 and requires operation corresponding to the movement direction. Thus, the difficulty for catching the moving object 104 can be adjusted.

(4) In the first embodiment, the movement probability for each movement target position 106 is set to the memory unit 32, and a subsequent movement target position 106 is randomly selected based on the movement probability at the movement change timing. Thus, the moving object 104 in the game field 102 has a wider variety of movement patterns.

(5) In the first embodiment, if a cancellation operation of the controller 20 is detected during the execution of the standby mode before the preparation condition is satisfied for operating the controller 20 in the second direction, the first operation rendering based on the operation of the controller 20 in the first direction is cancelled. Thus, the operation of the controller 20 can start the battle mode (game) and cancel starting of the battle mode.

(6) In the first embodiment, the position of the item 109 in the game field 102 is determined based on the movement state (speed, acceleration, and orientation) of the controller 20 operated in the first direction. Thus, the operation of the controller 20 can determine the position of the item 109 in the game field 102.

(7) In the first embodiment, the validity of the first operation of the controller 20 is determined based on the battle circle 111 and the position of the moving object 104, and the second operation of the controller 20 is valid if the battle circle 111 reaches the central circle 112. Thus, in the game in which operation is performed on the moving object 104, operation variations are increased. Further, the battle circle 111 is a display indicating when the first operation and the second operation are performed while the size of the battle circle 111 also changes in correspondence with the situation of the game. Thus, the viewpoint does not necessarily have to be moved to a region other than the battle circle in order to understand the game situation. This provides a user interface that allows for easy recognition of the game situation. Further, the game can be developed in correspondence with the battle circle 111 and the position of the moving object 104.

(8) In the first embodiment, the size of the battle circle 111 is changed based on the validity of the first operation of the controller 20. Thus, the first operation of the controller 20 can be linked with the difficulty for catching the moving object 104 using the battle circle 111.

(9) In the first embodiment, the change amount of the battle circle 111 corresponding to the validity of the first operation of the controller 20 is determined for each area of the battle circle 111. Thus, the difficulty for catching the moving object 104 can be changed in correspondence with the operation position of the controller 20 in the battle circle 111.

(10) In the first embodiment, the change amount of the battle circle 111 is determined based on the type of the moving object 104, the type of the item 103 associated with the first operation of the controller 20, and the like. Thus, the types of the moving object 104, the item 103, and the like can be used to adjust the change in the size of the battle circle 111 and control the difficulty for catching the moving object 104.

(11) In the first embodiment, if the size of the battle circle 111 reaches the outer circle 113, the acceptance of the first operation of the controller 20 ends. Thus, the progress state of the game until when the first operation of the controller 20 ends can be understood from the battle circle 111.

(12) In the first embodiment, if the size of the battle circle 111 reaches the central circle 112, the second operation of the controller 20 is valid. Thus, the progress state of the game until when the second operation of the controller 20 is valid can be understood from the battle circle 111.

(13) In the first embodiment, the movement range 107 of the moving object 104 in the game field 102 is determined based on the type of the moving object 104. Thus, the difficulty for catching the moving object 104 can be respectively changed for each type of moving object using the battle circle 111.

(14) In the first embodiment, if the intervention operation of the controller 20 is detected, the movement direction of the moving object 104 is changed based on the direction of the intervention operation of the controller 20. Thus, the operation of the controller 20 can adjust the position of the moving object 104.

(15) in the first embodiment, it is determined whether or not the intervention operation of the controller 20 has succeeded based on the type of the moving object 104, the type of the item 103 associated with the intervention operation of the controller 20, and the like. This diversifies the intervention operation in correspondence with the types of the moving object 104, the item 103, and the like.

(16) In the first embodiment, the changed movement direction of the moving object 104 is determined based on the type of the moving object 104, the type of the item 103 associated with the intervention operation of the controller 20, and the like. This diversifies the intervention operation in correspondence with the types of the moving object 104, the item 103, and the like.

(17) In the first embodiment, the changing of the movement direction of the moving object 104 by the intervention operation of the controller 20 is resumed under the condition that the predetermined time has elapsed from when the movement direction of the moving object 104 was changed by the intervention operation of the controller 20. This allows the moving object 104 to wander again after the intervention.

Second Embodiment

A second embodiment of a game processing program, a game processing method, and a game processing device will now be described. The second embodiment differs from the first embodiment in that the processes for the battle mode are partially changed from that of the first embodiment. Like or same reference numerals are given to those components that are the same as the corresponding components of the first embodiment. Such components will not be described in detail.

The game of the present embodiment is the same as the first embodiment in that it is determined in correspondence with the validity of the first operation of the controller 20 whether or not a catching operation performed on a moving subject succeeds during the execution of the battle mode. In the present embodiment, the size of the battle circle does not change in correspondence with the validity of the first operation of the controller 20, and the battle circle contracts as time elapses. That is, the battle circle is not repeatedly enlarged and contracted in correspondence with the validity of the first operation and instead continues to contract as time elapses. In this regard, the size of the battle circle serves as an index that indicates the elapsed time of the game. In this case, if the first operation of the controller 20 is determined as being valid, a count value that is temporarily stored in a memory is incremented. At the point in time when the size of the battle circle is smaller than a threshold value, the count value is used to determine whether or not the moving object has been successfully caught.

First, as shown in FIG. 15, in a main process for the battle mode, the control unit 31 of the game processing device 30 displays the battle circle (step S131). More specifically, the game management unit 35 of the control unit 31 displays the battle circle (first region) within the movable range of the moving object that is set to the game field.

Next, the control unit 31 contracts the battle circle as time elapses (step S132). More specifically, the game management unit 35 of the control unit 31 contracts the radius from the center of the battle circle as time elapses. The battle circle does not have to be circular as long as it is contracted so as to be included in the previous battle circle.

Then, the control unit 31 determines whether or not the size of the battle circle is smaller than the threshold value (step S133). More specifically, the game management unit 35 of the control unit 31 compares the radius of the battle circle with the threshold value (lower limit threshold value).

If the control unit 31 determines that the size of the battle circle is greater than or equal to the threshold value ("NO" in step S133), the control unit 31 returns to step S131. More specifically, the control unit 31 repeats the processes of step S131 to step S133 until the size of the battle circle reaches the threshold value.

If it the control unit 31 determines that the size of the battle circle is smaller than the threshold value ("YES" in step S133), the control unit 31 determines whether or not the second operation of the controller 20 has been performed within a reference time (step S134).

Then, if the second operation has been detected within the reference time ("YES" in step S134), the control unit 31 determines whether or not the count value of a valid first operation of the controller 20 is greater than or equal to the threshold value (step S135). The count value incremented in an interrupt process for the battle mode, which will be described later.

If the control unit 31 determines that the count value of the first operation of the controller 20 as being valid is greater than or equal to the threshold value ("YES" in step S135), the control unit 31 executes a catch success rendering of the moving object (step S136).

If the control unit 31 determines that the count value of the first operation of the controller 20 as being valid is smaller than the threshold value ("NO" in step S135), the control unit 31 executes a catch failure rendering of the moving object (step S137).

Also, if the second operation of the controller 20 has not been detected within the reference time ("NO" in step S134), the control unit 31 executes the catch failure rendering of the moving object (step S137).

Figure 16:
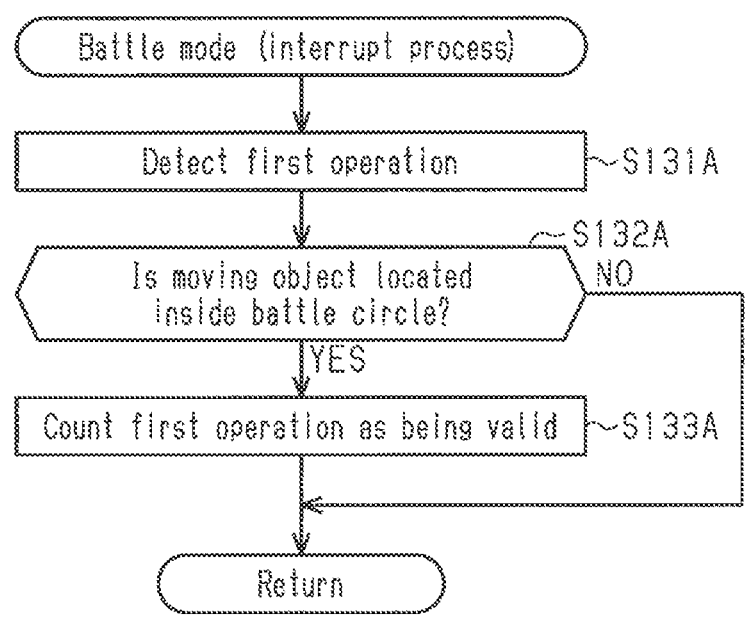
FIG. 16 is a flowchart illustrating an interrupt process for the battle mode of the second embodiment.

The interrupt process for the battle mode will now be described with reference to FIG. 16. This process is executed if the first operation of the controller 20 is detected during the execution of the processes of step S131 to step S134 in the main process for the battle mode (step S131A).

At the point in time when the first operation is detected, the control unit 31 determines whether or not the moving object is located inside the battle circle (step S132A).

If the control unit 31 determines that the moving object is located inside the battle circle ("YES" in step S132A), the control unit 31 determines that the first operation of the controller 20 is valid.

In this case, the control unit 31 counts the first operation of the controller 20 as being valid (step S133A). More specifically, the game management unit 35 of the control unit 31 increments the count value that is temporarily stored in the memory and ends the interrupt process for the battle mode.

If the control unit 31 determines that the moving object is located outside the battle circle ("NO" in step S132A), the control unit 31 ends the interrupt process for the battle mode without counting the first operation of the controller 20 as being valid.

As described above, the second embodiment has the following advantage in addition to the advantages described in the first embodiment.

(18) in the second embodiment, the size of the battle circle does not change in correspondence with the validity of the first operation of the controller 20. Thus, the elapsed time can be visually understood from the size of the battle circle, and the moving object can be caught by using the battle circle 111.

Third Embodiment

A third embodiment of a game processing program, a game processing method, and a game processing device will now be described. The third embodiment differs from the first embodiment in that the interrupt process for the moving object setting of the first embodiment is partially changed. Like or same reference numerals are given to those components that are the same as the corresponding components of the first embodiment. Such components will not be described in detail.

The present embodiment is the same as the first embodiment in that the movement direction of the moving object is changed if the intervention operation of the controller 20 is performed. In the present embodiment, the method for changing the movement direction of the moving object is switched based on the relative positional relationship of the direction of the intervention operation of the controller 20 and the movement range of the moving object.

Figure 17:
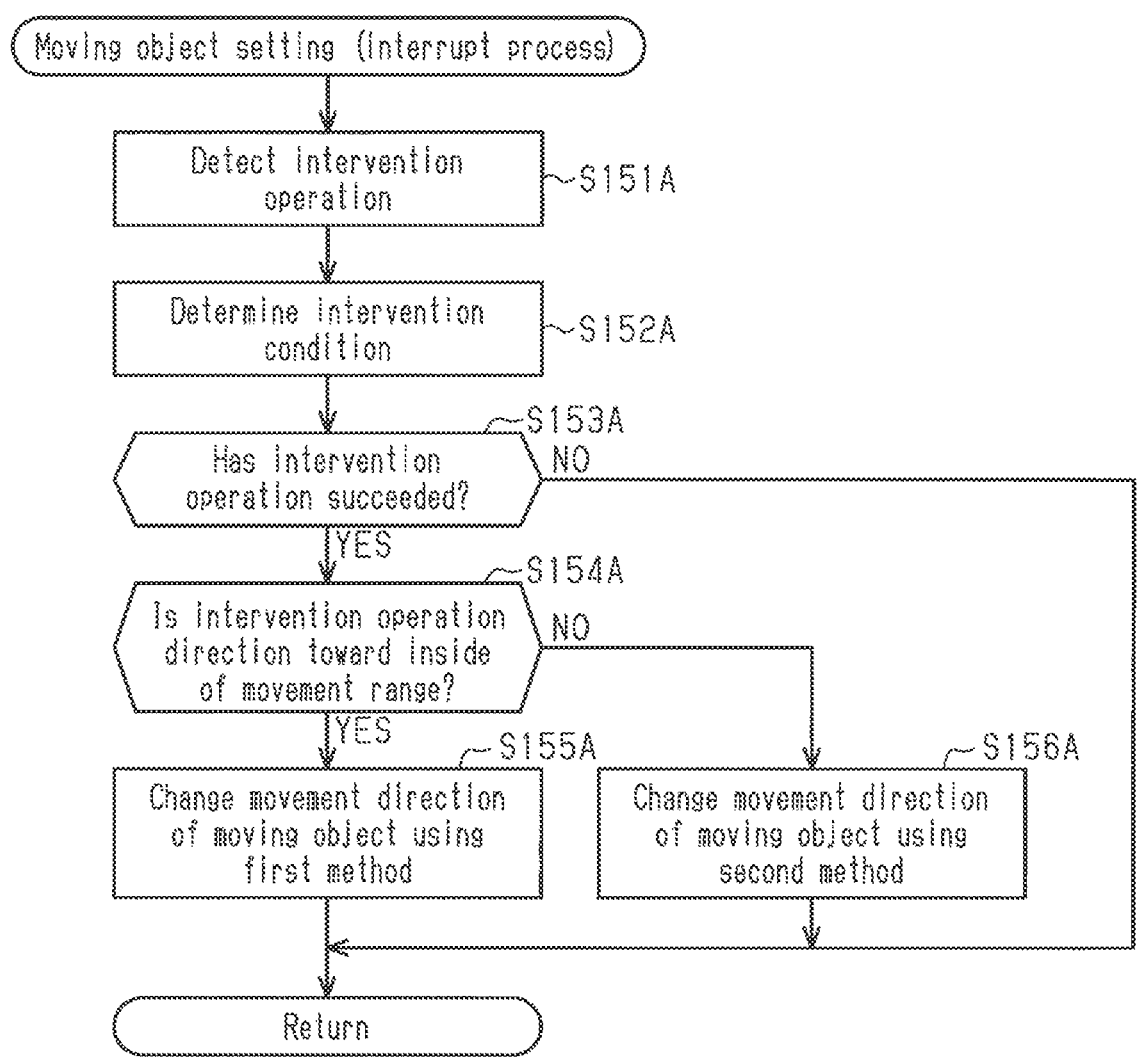
FIG. 17 is a flowchart illustrating an interrupt process for a moving object setting of a third embodiment.

More specifically, as shown in FIG. 17, if the intervention operation of the controller 20 is detected during the execution of the main process for the moving object setting (step S151A), the control unit 31 of the game processing device 30 executes an interrupt process for the moving object setting.

In the interrupt process for the moving object setting, the control unit 31 changes the movement direction of the moving object based on the direction of the intervention operation of the controller 20.

First, the control unit 31 determines an intervention condition (step S152A).

Next, the control unit 31 determines whether or not the intervention operation of the controller 20 has succeeded based on the determined intervention condition (step S153A).

If the control unit 31 determines that the intervention operation of the controller 20 has succeeded ("YES" in step S153A), the control unit 31 determines the relative positional relationship of the direction of the intervention operation of the controller 20 and the movement range of the moving object (step S154A).

If the control unit 31 determines that the direction of the intervention operation of the controller 20 is oriented toward the inside of the movement range of the moving object ("YES" in step S154A), the control unit 31 uses a first method to change the movement direction of the moving object (step S155A) and end the interrupt process for the moving object setting. The first method will be described later with reference to FIGS. 18A and 18B.

If the control unit 31 determines that the direction of the intervention operation of the controller 20 is oriented toward the outer side of the movement range of the moving object ("NO" in step S154A), the control unit 31 uses a second method to change the movement direction of the moving object (step S156A) and end the interrupt process for the moving object setting. The second method will be described below with reference to FIGS. 18C and 18D.

The image displayed on the display 14 of the HMD 10 during the execution of the moving object setting will now be described with reference to FIGS. 18A to 18D.

Figure 18A:
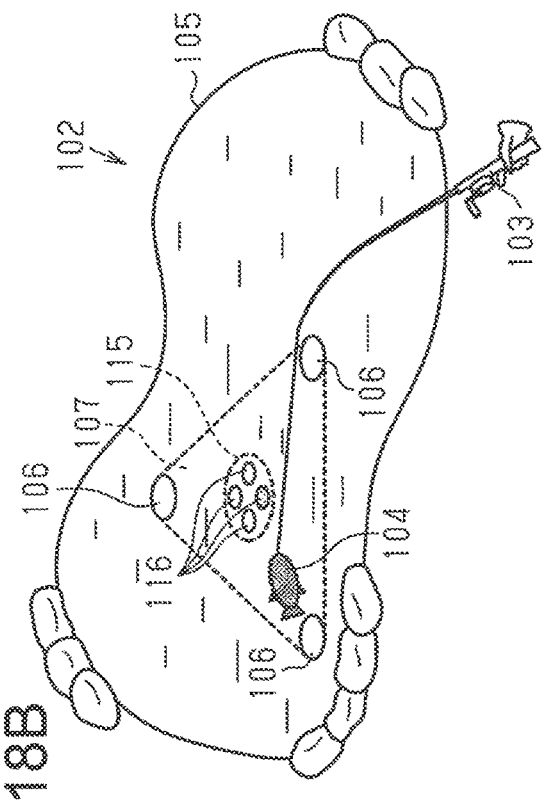
FIGS. 18A to 18D are schematic diagrams each illustrating an image displayed on the display during the execution of the moving object setting of the third embodiment.
Figure 18B:
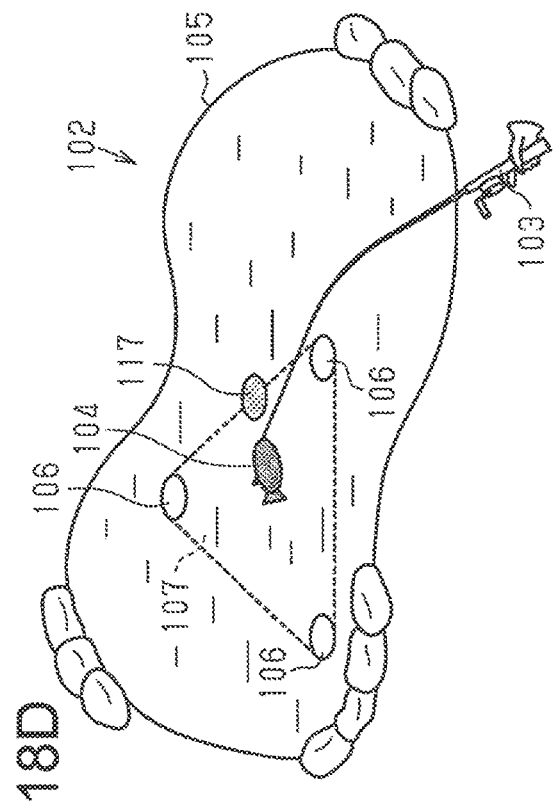

It is assumed in FIGS. 18A and 18B that the control unit 31 of the game processing device 30 has detected the intervention operation of the controller 20 while the moving object 104 moves to the outer side of the movement range 107. In this case, the control unit 31 uses the first method to change the movement direction of the moving object. In the first method, the control unit 31 randomly selects a subsequent movement target position 116 from a plurality of movement target positions 116 set for a central area 115 of the movement range 107 of the moving object 104.

In this case, the control unit 31 changes the size of the central area 115 in which the movement target positions 116 are set based on the type of the moving object 104, the type of the item 103 (fishing rod) associated with the intervention operation of the controller 20, and the like.

For example, for a moving object 104 having a high degree of rarity, the central area 115 is large. This can increase the difficulty for catching the moving object 104.

Figure 18C:
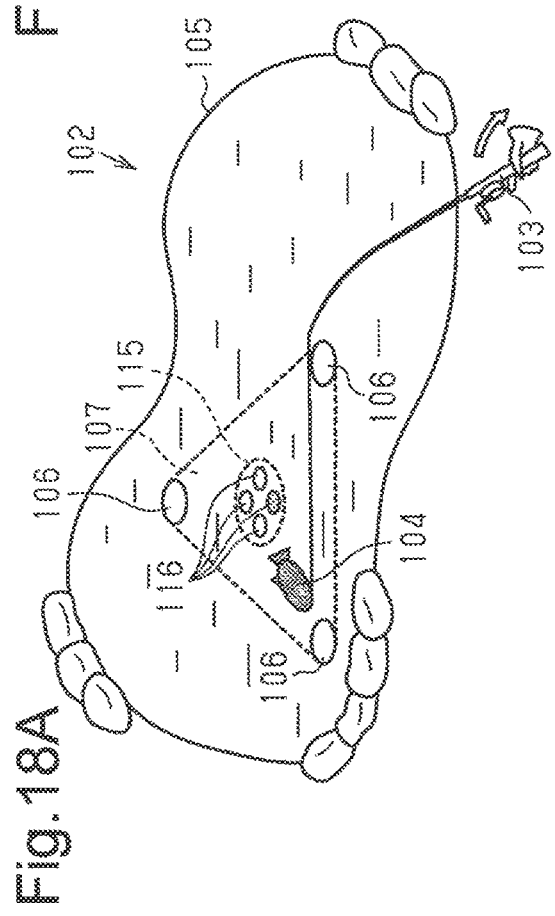
Figure 18D:
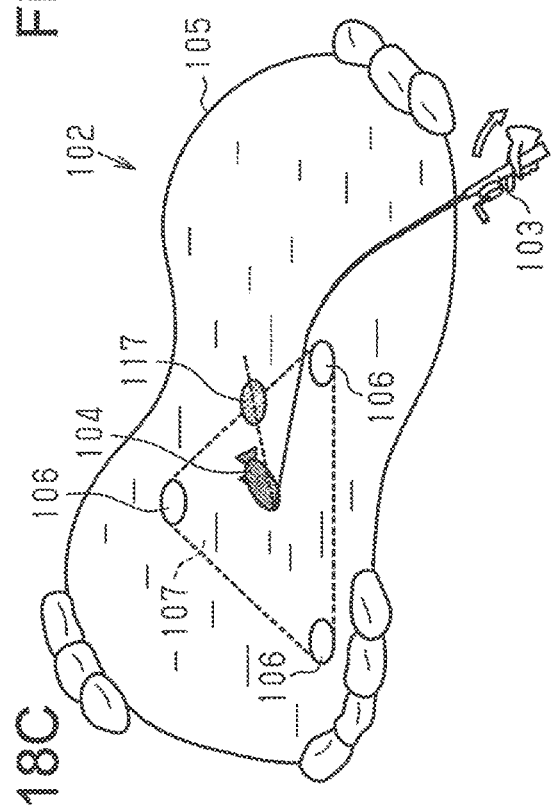

Further, it is assumed in FIGS. 18C and 18D that the control unit 31 has detected the intervention operation of the controller 20 while the moving object 104 moves to the inner side of the movement range 107. In this case, the control unit 31 uses the second method to change the movement direction of the moving object. In the second method, the control unit 31 sets, as a subsequent movement target position 117, a position where the direction of the intervention operation of the controller 20 intersects an outer edge of the movement range 107 of the moving object 104. That is, the control unit 31 causes the direction of the intervention operation of the controller 20 to match the changed movement direction of the moving object.

As described above, the third embodiment has the following advantage in addition to the advantages described in the first embodiment.

(19) in the third embodiment, the changed movement direction of the moving object 104 is determined based on the relative positional relationship of the direction of the intervention operation of the controller 20 and the movement range 107 of the moving object 104. Thus, the movement direction of the moving object 104 can be changed to various directions by the intervention operation of the controller 20.

Each of the above embodiments may be modified as described below.

In each of the above embodiments, the initial position for the avatar 108 is set in advance at a plurality of positions in the game field 102. The method for setting the initial position for the avatar 108 is not limited to the advanced setting. For example, if the game field 102 is selected by a player, the control unit 31 may determine the movement range 107 of the moving object 104 in the game field 102 and arrange the initial position for the avatar 108 at any proximate position.

In each of the above embodiments, the type of the moving object 104 is associated with the game field 102 in advance. The method for selecting the type of the moving object 104 is not limited to the advanced setting. For example, if the game field 102 is selected by a player, the control unit 31 may set the initial position for the avatar 108 in the game field 102 and select the type of the moving object 104 moving in the game field 102 based on the set position of the avatar 108.

In each of the above embodiments, the movement change timing of the moving object 104 is set at predetermined time intervals. The method for determining the movement change timing is not limited to the predetermined time intervals. For example, the control unit 31 may set, as the movement change timing of the moving object 104, a timing at which the moving object 104 reaches a predetermined movement target position 106.

In each of the above embodiments, a movement probability is set for each of the movement target positions 106 of the moving object 104 in advance, and a subsequent movement target position 106 of the moving object 104 is randomly selected based on the movement probability. The method for randomly selecting the movement target position 106 is not limited to a method based on the movement probability. For example, the control unit 31 may randomly select a subsequent movement target position 106 from a plurality of movement target positions 106 corresponding to the moving object 104.

In each of the above embodiments, the arrangement, number, and movement probability of the movement target positions 106 are set in advance in association with the game field 102 for each of the types of the moving object 104. The method for setting the arrangement, number, and movement probability of the movement target positions 106 corresponding to the type of the moving object 104 is not limited to the advanced setting. For example, the control unit 31 may change the arrangement, number, and movement probability of the movement target positions 106 of the moving object 104 in correspondence with the progress of the game.

In each of the above embodiments, the position of the item 109 in the game field 102 is determined based on the speed or acceleration of the operation of the controller 20 in the first direction. Instead, the position of the item 109 in the game field 102 may be determined based on an operation time of the operation of the controller 20 in the first direction. For example, the control unit 31 detects the direction and acceleration of the swing-down operation of the controller 20 and calculates, as the operation time of the operation of the controller 20 in the first direction, a required time from when the operation starts to when the operation ends. The position of the item 109 in the game field 102 is determined based on the calculated operation time. In this case, as the operation time of the controller 20 in the first direction becomes longer, the control unit 31 determines the position of the item 109 at a farther position as viewed from the viewpoint of the player.

In each of the above embodiments, if the operation of the controller 20 in the first direction is detected, a position lying on the extension line of the controller 20 in the first direction as viewed from the viewpoint of the player is determined as the position of the item 109. Instead, regardless of the operation direction of the controller 20, a position lying on the extension line in the direction of the attention position of the player may be determined as the position of the item 109. In this case, the control unit 31 determines an attention direction of the player in the HMD 10 and arranges the item 109 on the coordinates in the attention direction in the virtual space. Further, the position of the item 109 in the game field 102 may be determined by taking into account both the direction of the operation of the controller 20 and the direction of the attention position of the player.

In each of the above embodiments, the operation in the first direction (casting) is the swing-down operation of the controller 20, and the operation in the second direction (cancelling) is the swing-up operation of the controller 20. Instead, the operation performed in the first direction may be the operation that swings up and swings down the controller 20, and the operation performed in the second direction may be the operation that swings up the controller 20. Alternatively, the operation performed in the second direction may be operation that swings and/or turns the controller 20. These operations can be changed in correspondence with the configuration of the controller 20. For example, when the controller 20 includes a touch panel, the first operation may be a swipe operation or a flick operation performed on the touch panel, and the second operation may be the swing-up operation of the controller 20.

In each of the above embodiments, the first operation is the tap operation performed on the determination button, and the second operation is the swing-up operation of the controller 20. Instead, the first operation and the second operation may be the swing-up operation of the controller 20, and the operation amount of the second operation may be larger than the operation amount of the first operation. Alternatively, the first operation and the second operation may be the swing-up operation of the controller 20, and the lower limit value of the operation speed for performing the second operation may be larger than the lower limit value of the operation speed for performing the first operation. Further, the first operation and the second operation may be changed in correspondence with the configuration of the controller 20. For example, when the controller 20 includes a touch panel, the first operation may be a swipe operation or a flick operation performed on the touch panel, and the second operation may be the swing-up operation of the controller 20.

In each of the above embodiments, the battle circle ill indicating the validity of the first operation of the controller 20 is displayed during the execution of the battle mode as an index of the progress state of the game until the second operation of the controller 20 is valid. In this case, the index of the progress state of the game until the second operation of the controller 20 is valid may be displayed separately from the display of the battle circle 111. For example, the control unit 31 changes the initial value of a health gauge of the moving object 104 that is temporarily stored in the memory based on an operation state of the controller 20. The health gauge of the moving object 104 is displayed in an upper area of the game field 102 in addition to the battle circle 111.

In the second embodiment, the count value of the first operation of the controller 20 is calculated without taking into account the number of invalid first operations of the controller 20. Instead, the count value of the first operation of the controller 20 may be calculated taking into account the number of invalid first operations of the controller 20. For example, the control unit 31 calculates, as the count value of the first operation of the controller 20, the value obtained by subtracting the number of invalid first operations of the controller 20 from the number of valid first operations of the controller 20.

In the second embodiment, the number of valid first operations of the controller 20 is calculated as the count value of the first operation of the controller 20. That is, the count value of the first operation of the controller 20 is calculated in the same manner for each area of the battle circle 111 if the first operation of the controller 20 is valid. Instead, the increment amount of the count value if the first operation of the controller 20 is valid may be separately set for each area of the battle circle 111.

Further, if the first operation of the controller 20 is valid, the increment amount of the count value may be separately determined for each type of the moving object 104, each type of the item 103 (fishing rod) associated with the first operation of the controller 20, and the like.

For example, a small increment amount of the count value may be set for a moving object 104 having a high degree of rarity if the first operation of the controller 20 is valid. More specifically, the memory holds a table or a function to determine the increment amount of the count value (increment amount determination information) for each type of the moving object 104. The increment amount corresponding to the difficulty for catching is set to the increment amount determination information. The control unit 31 determines the increment amount based on a moving object 104 that is subject to catching. Thus, the difficulty for catching the moving object 104 can be adjusted by, for example, setting a smaller increment amount as the degree of rarity becomes higher.

In the first and third embodiments, if the first operation of the controller 20 is valid, the contraction amount of the battle circle 111 is determined for each area of the battle circle 111. The method for determining the contraction amount of the battle circle 111 is not limited to the method for determining the amount for each area. For example, the control unit 31 may set the same contraction amount of the battle circle 111 if the first operation of the controller 20 is valid without dividing the battle circle 111 into a plurality of areas.

In the first and third embodiments, the battle circle 111 is enlarged if the first operation of the controller 20 is invalid. The method for changing the battle circle 111 is not limited to the method for enlarging the battle circle 111 in correspondence with the validity of the first operation. For example, even if the first operation of the controller 20 is invalid, the control unit 31 may skip the process for enlarging the battle circle 111.

In the first and third embodiments, the change amount of the battle circle 111 corresponding to the validity of the first operation of the controller 20 is determined based on the type of the moving object 104, the type of the item 103 (fishing rod) associated with the first operation of the controller 20, and the like. The method for determining the change amount of the battle circle 111 is not limited to the method based on the type of the moving object 104, the type of the item 103, and the like. For example, the control unit 31 may set the same change amount of the battle circle 111 corresponding to the validity of the first operation of the controller 20.

In each of the above embodiments, the size of the battle circle 111 is changed as time elapses. The method for changing the battle circle 111 is not limited to the method based on the elapsed time. For example, regardless of the elapsed time, the control unit 31 may determine the size of the battle circle 111 based only on the validity of the first operation of the controller 20.

In the first and third embodiments, the battle mode ends if the size of the battle circle 111 reaches the outer circle 113. The condition for ending the battle mode is not limited to such a condition. For example, the control unit 31 may determine, as the ending condition, that the elapsed time of the battle mode has reached a predetermined time and that the number of invalid first operations of the controller 20 has reached a predetermined value.

In each of the above embodiments, it is determined whether or not the first operation of the controller 20 is started based on the affinity of the type of the moving object 104 and the type of the item 109 associated with the first operation of the controller 20. The condition for determining whether or not the first operation of the controller 20 is started is not limited to such a condition. For example, the control unit 31 may use, as the determination condition, the affinity of the game field 102 and the type of the item 109 (lure) associated with the first operation of the controller 20. In this case, for example, the type of the item 109 that can be used in the game field 102 is recorded in the item information 40.

In each of the above embodiments, the second operation of the controller 20 is determined as being valid under the condition that the reference time has not elapsed from when the size of the battle circle 111 reached the central circle 112. The condition for determining that the second operation of the controller 20 is valid is not limited to such a condition. For example, the control unit 31 may adopt a condition that the moving object 104 has not moved out of the battle circle 111. In addition, if the size of the battle circle 111 reaches the central circle 112, the control unit 31 may determine that the second operation of the controller 20 is valid until the second operation of the controller 20 is detected.

In each of the above embodiments, if the intervention operation of the controller 20 is detected, the movement direction of the moving object 104 can be changed to the outside of the movement range 107 of the moving object 104, which is set based on the movement range information. Instead, the control unit 31 may limit the movement direction of the moving object 104 with the intervention operation of the controller 20 to the inside of the movement range 107.

In each of the above embodiments, the changed movement direction of the moving object 104 is determined based on the direction of the intervention operation of the controller 20. In addition to the direction of the intervention operation of the controller 20, the movement direction of the moving object prior to changing may be further taken into account to determine the changed movement direction of the moving object 104. For example, the control unit 31 generates vector components in the direction of the intervention operation of the controller 20 and vector components in the movement direction of the moving object 104 prior to changing to determine the direction of the combined vector as the changed movement direction of the moving object 104.

In the third embodiment, a subsequent movement target position 116 of the moving object 104 is randomly selected from a plurality of movement target positions 116 set for the central area 115 if the direction of the intervention operation of the controller 20 is oriented toward the inside of the movement range 107 of the moving object 104. The method for determining the movement target position 116 is not limited to such a method. For example, the movement probability of the moving object 104 is set in advance for each movement target position 116, which is set in the central area 115. The control unit 31 randomly selects a subsequent movement target position 116 of the moving object 104 based on the movement probability.

Further, the control unit 31 may randomly select a subsequent movement target position 116 of the moving object 104 based on the relative positional relationship of the direction of the intervention operation of the controller 20 and the movement target positions 116 set for the central area 115. For example, the control unit 31 sets an extension line in the direction of the intervention operation of the controller 20 as viewed from the position of the moving object 104. The control unit 31 determines a movement target position 116 that is most proximate to the extension line as a subsequent movement target position 116 of the moving object 104.

Additionally, the control unit 31 may determine a predetermined position in the central area 115, such as the center point of the movement range 107 of the moving object 104, as a subsequent movement target position of the moving object 104 when the intervention operation of the controller 20 is performed.

In each of the above embodiments, it is determined whether or not the intervention operation of the controller 20 has been successfully performed based on the type of the moving object 104, the type of the item 103 (fishing rod) associated with the intervention operation of the controller 20, and the like. The condition for determining whether or not the intervention operation of the controller 20 has been successfully performed is not limited to such a condition. For example, the control unit 31 may use, as a condition, the affinity of the game field 102 and the item 103 (fishing rod) associated with the intervention operation of the controller 20, the affinity of the moving object 104 and the item 103 (fishing rod) associated with the intervention operation of the controller 20, and the like. Further, if the intervention operation of the controller 20 is detected, the control unit 31 may cause the intervention operation of the controller 20 to succeed without setting a precondition and randomly determine whether or not the intervention operation of the controller 20 has been successfully performed.

In each of the above embodiments, the changed movement direction of the moving object 104 is determined based on the type of the moving object 104, the type of the item 103 associated with the intervention operation of the controller 20, and the like. The condition for determining the changed movement direction of the moving object 104 is not limited to such a condition. For example, the control unit 31 may use, as a condition, the affinity of the game field 102 and the item 103 (fishing rod) associated with the intervention operation of the controller 20, the affinity of the moving object 104 and the item 103 (fishing rod) associated with the intervention operation of the controller 20, and the like. Further, if the intervention operation of the controller 20 is detected, the control unit 31 may determine the same changed movement direction for the moving object 104 based on the direction of the intervention operation of the controller 20.

In each of the above embodiments, when the movement direction of the moving object 104 is changed by the intervention operation of the controller 20, intervals are set to the timing for changing the movement direction of the moving object 104. Instead, the control unit 31 does not have to set intervals to the timing for changing the movement direction of the moving object 104 by the intervention operation of the controller 20. In this case, even when changing the movement direction of the moving object 104 by the intervention operation of the controller 20, the control unit 31 continues to accept the intervention operation of the controller 20.

Further, the lengths of the intervals may be variable based on the type of the moving object 104, the type of the item 103 (fishing rod) associated with the intervention operation of the controller 20, and the like. In this case, the control unit 31 maintains information used to set intervals in correspondence with the type of the moving object 104, the type of the item 103, and the like.

For example, for a moving object 104 having a high degree of rarity, long intervals may be set. This can increase the difficulty for catching the moving object 104.

In each of the above embodiments, the case in which a game played by two players is presented is described. Instead, a game played by three players or more may be presented. In this case, the HMDs 10 that are equal in number to the players are connected to the game processing device 30.

In each of the above embodiments, the game processing device 30 determines the position and orientation of the head of a player. Instead, the HMD controller 11 may obtain the position and orientation of the head based on a detection signal of the sensor 12. As another option, the HMD 10 may be a device such as a smartphone including a touch panel and a communication unit and may include the control unit 31. In this case, the control unit 31 of the device such as a smartphone consecutively obtains information via a network from a server that records, for example, the game field information 37 to cause the game to be executed. When multiple persons play the game, the HMDs 10 may communicate with one another and communicate via the server. Thus, the HMD 10 can have at least part of the functions of the game processing device 30 described in each of the above embodiments.

In each of the above embodiments, the HMD 10 determines the position and orientation of the head of a player. Instead, the HMD 10 may determine the position and orientation of a section of the player other than the head, for example, the position of an iris.

In each of the above embodiments, the game presented to a player is applied to a virtual reality game that displays a three-dimensional image on the display 14. Instead, the above game may be a game that displays a two-dimensional image on the display. In this case, the HMD 10 may be changed to an installation-type display. The player operates the controller 20 while checking a display on the display and performs operation such as casting.

In each of the above embodiments, a plurality of players view a moving object in the virtual space from the perspective of the avatar 108 corresponding to each player. Instead, each player may be able to switch the viewpoint. For example, each player may view a moving object in the virtual space from a bird's-eye view at the rear of the avatar as well as from the viewpoint of the avatar. More specifically, in the virtual space, the control unit 31 sets, for the avatar, a viewpoint at a far side of the game field and outputs an image from this viewpoint to the HMD 10. In this case, for example, each player may select a viewpoint before the game starts or may be able to change a viewpoint while playing the game.

Figure 19:
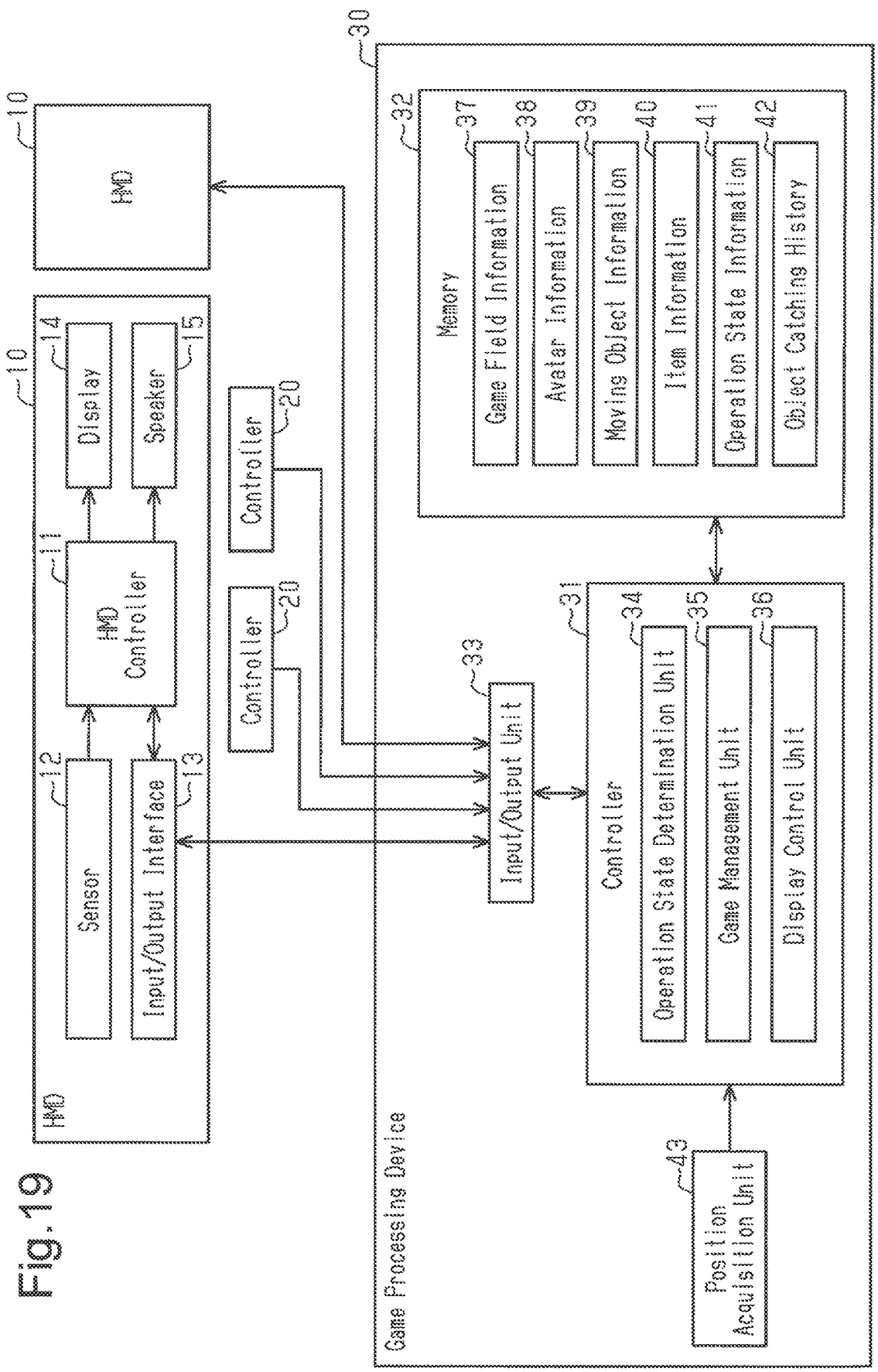
FIG. 19 is a schematic diagram illustrating a modified example of a system.

The game device 30 may execute game control using the position of the game device 30. In this aspect, as shown in FIG. 19, the game device 30 includes an absolute position acquisition unit 43. The absolute position acquisition unit 43 acquires position information transmitted from a satellite positioning system such as a global positioning system (GPS). The control unit 31 of the game device 30 determines an absolute position of the game processing device 30 based on the information acquired by the absolute position acquisition unit 43. Further, the memory unit 32 of the game device 30 stores game map data. The map data stores a region or a point where the game is executable in association with the absolute position. The region or the point where the game is executable is, for example, a region or a point where a fishing game is executable. The region or the point where the fishing game is executable may be determined using, for example, an old map. Referring to the acquired absolute position and the map data, the control unit 31 determines whether or not the position of the game device 30 is the region or the point where the fishing game is executable. If the control unit 31 determines that the position of the game device 30 is not the region or the point where the fishing game is executable, the control unit 31 does not set the fishing game to an executable state. For example, the display 14 of the HMD 10 does not display the region or the point such as sea, pond, and river where the fishing game is executable. If the control unit 31 determines that the position of the game device 30 is the region or the point where the fishing game is executable, the control unit 31 sets the fishing game to an executable state. For example, the display 14 of the HMD 10 displays the region or the point such as sea, pond, and river where the fishing game is executable.

In each of the above embodiments, a fishing game is provided as an example of a game. Instead, the present disclosure may be applied to other games. That is, the present disclosure may be applied to any game in which a player controls the movement direction of a moving object in a game field by an input operation of a controller.

The invention claimed is:

1. A non-transitory computer-readable medium that stores instructions which, when executed by a processor, cause the processor to:
   move a moving object in a first direction within a movement range set in a game field;

detect that, during movement of the moving object in the first direction, a controller is operated in an operation direction that is different from the first direction;

responsive to the operation direction being oriented toward an inside of the movement range, terminate the movement of the moving object in the first direction and move the moving object in a second direction that is randomly determined; and responsive to the operation direction being oriented toward an outer side of the movement range, terminate the movement of the moving object in the first direction and move the moving object in the operation direction.

2. The non-transitory computer-readable medium according to claim 1, wherein another movement range of another moving object is set based on movement range information that indicates the another movement range of the another moving object, and the second direction includes a direction in which the moving object moves to a position located outside the another movement range of the another moving object.

3. The non-transitory computer-readable medium according to claim 1, wherein the instructions, when executed by the processor, cause the processor to determine whether or not a direction in which another moving object is moved can be changed based on a type of the another moving object.

4. The non-transitory computer-readable medium according to claim 3, wherein the instructions, when executed by the processor, cause the processor to responsive to determining that the direction in which the another moving object is moved can be changed, change the direction in which the another moving object is moved to a third direction, wherein a degree of matching the operation direction with the third direction for a moving object having a first degree of rarity is lower than a degree of matching the operation direction with the third direction for a moving object having a second degree of rarity that is lower than the first degree of rarity.

5. The non-transitory computer-readable medium according to claim 1, wherein the instructions, when executed by the processor, cause the processor to determine whether or not a direction in which another moving object is moved can be changed based on a type of an item associated with operation of the controller.

6. The non-transitory computer-readable medium according to claim 1, wherein the second direction is determined based on a relative positional relationship of operation direction and another movement range of the moving object based on a position of the moving object.

7. The non-transitory computer-readable medium according to claim 1, wherein a size of a central area within the movement range is determined based on a type of another moving object.

8. The non-transitory computer-readable medium according to claim 1, wherein the instructions, when executed by the processor, cause the processor to:

maintain a direction in which another moving object is moved until a predetermined time elapses from when the direction is changed, and resume change of the direction in which the another moving object is moved when the predetermined time elapses.

9. The non-transitory computer-readable medium according to claim 1, wherein the instructions, when executed by the processor, cause the processor to:

start detecting that the controller is operated in a direction that is different from a direction in which another moving object is moved when the another moving object and an item associated with operation of the controller satisfy a predetermined start determination condition.

10. The non-transitory computer-readable medium according to claim 1, wherein the instructions, when executed by the processor, cause the processor to:

determine whether or not a direction in which another moving object is moved can be changed based on an operation state of the another moving object.

11. The non-transitory computer-readable medium according to claim 1, wherein the instructions, when executed by the processor, cause the processor to:

change a direction in which the moving object is moved at a predetermined timing.

12. A method, comprising:

moving, by circuitry, a moving object in a first direction within a movement range set in a game field;

detecting that, during movement of the moving object in the first direction, a controller is operated in an operation direction that is different from the first direction;

responsive to the operation direction being oriented toward an inside of the movement range, terminating the movement of the moving object in the first direction and moving the moving object in a second direction that is randomly determined; and responsive to the operation direction being oriented toward an outer side of the movement range, terminating the movement of the moving object in the first direction and move the moving object in the operation direction.

13. The method according to claim 12, further comprising:

determining whether or not a direction in which another moving object is moved can be changed based on a type of the another moving object.

14. The method according to claim 12, further comprising:

determining whether or not a direction in which another moving object is moved can be changed based on a type of an item associated with operation of the controller.

15. The method according to claim 12, wherein the second direction is determined based on a relative positional relationship of operation direction and another movement range of the moving object based on a position of the moving object.

16. The method according to claim 12, further comprising:

maintaining a direction in which another moving object is moved until a predetermined time elapses from when the direction is changed; and resuming change of the direction in which the another moving object is moved when the predetermined time elapses.

17. The method according to claim 12, further comprising:

starting detecting that the controller is operated in a direction that is different from a direction in which another moving object is moved when the another moving object and an item associated with operation of the controller satisfy a predetermined start determination condition.

18. The method according to claim 12, further comprising:
- determining whether or not a direction in which another moving object is moved can be changed based on an operation state of the another moving object.

19. A device, comprising:
circuitry configured to:
- move a moving object in a first direction within a movement range set in a game field,
- detect that, during movement of the moving object in the first direction, a controller is operated in an operation direction that is different from the first direction,
- responsive to the operation direction being oriented toward an inside of the movement range, terminate the movement of the moving object in the first direction and move the moving object in a second direction that is randomly determined, and
- responsive to the operation direction being oriented toward an outer side of the movement range, terminate the movement of the moving object in the first direction and move the moving object in the operation direction.

\* \* \* \* \*